US009728077B1

(12) United States Patent
Fu et al.

(10) Patent No.: US 9,728,077 B1
(45) Date of Patent: *Aug. 8, 2017

(54) ERECEPTIONIST AND ENEIGHBORHOOD WATCH SYSTEM FOR CRIME PREVENTION AND/OR VERIFICATION

(71) Applicant: Kuna Systems Corporation, San Bruno, CA (US)

(72) Inventors: Sai-Wai Fu, Los Altos, CA (US); Haomiao Huang, Redwood City, CA (US)

(73) Assignee: KUNA SYSTEMS CORPORATION, San Bruno, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/246,818

(22) Filed: Aug. 25, 2016

Related U.S. Application Data

(63) Continuation-in-part of application No. 14/205,946, filed on Mar. 12, 2014, now Pat. No. 9,542,832, and a continuation-in-part of application No. 14/504,632, filed on Oct. 2, 2014.

(60) Provisional application No. 61/783,565, filed on Mar. 14, 2013.

(51) Int. Cl.
| | | |
|---|---|---|
| *G08B 1/08* | (2006.01) | |
| *G08B 29/18* | (2006.01) | |
| *G08B 27/00* | (2006.01) | |
| *G08B 13/196* | (2006.01) | |
| *G08B 25/00* | (2006.01) | |

(52) U.S. Cl.
CPC ..... *G08B 29/185* (2013.01); *G08B 13/19691* (2013.01); *G08B 25/008* (2013.01); *G08B 27/008* (2013.01)

(58) Field of Classification Search
CPC G08B 29/185; G08B 13/1969; G08B 25/008; G08B 27/008
USPC ... 340/539.1, 539.11, 539.17, 539.13, 426.1, 340/426.2, 506
See application file for complete search history.

(56) References Cited

U.S. PATENT DOCUMENTS

| | | | | |
|---|---|---|---|---|
| 5,959,529 | A | * | 9/1999 | Kail, IV ................. G01S 19/17 128/903 |
| 7,952,476 | B1 | | 5/2011 | Causey ......................... 340/506 |
| 2006/0154642 | A1 | | 7/2006 | Scannell .................... 455/404.1 |
| 2008/0249969 | A1 | | 10/2008 | Tsui ................................ 706/46 |
| 2012/0239808 | A1 | | 9/2012 | Davis ............................ 709/224 |
| 2012/0286949 | A1 | | 11/2012 | Worthington .............. 340/539.1 |

* cited by examiner

*Primary Examiner* — Daryl Pope
(74) *Attorney, Agent, or Firm* — Christopher P. Maiorana, PC

(57) ABSTRACT

A system comprising a camera sensor, a circuit and an identification device. The camera sensor may be configured to generate video data of an environment. The circuit may be configured to (A) communicate with a network through a wireless connection, (B) provide an electrical connection to (i) a plurality of components and (ii) the camera sensor and (C) enable at least one of (i) the components and (ii) the camera sensor in response to an authentication signal. The identification device may be configured to generate the authentication signal. The plurality of components may be configured to implement a virtual receptionist. The video data may be transmitted to the network. The authentication signal may be transmitted using the network. The notifications may be generated by the components.

19 Claims, 11 Drawing Sheets

ERECEPTIONIST AND ENEIGHBORHOOD WATCH SYSTEM FOR CRIME PREVENTION AND/OR VERIFICATION

This application relates to U.S. Ser. No. 14/205,946, filed Mar. 12, 2014, which relates to U.S. Provisional Application No. 61/783,565, filed Mar. 14, 2013. This application also relates to U.S. Ser. No. 14/504,632, filed Oct. 2, 2014. Each of the mentioned applications are hereby incorporated by reference in their entirety.

FIELD OF THE INVENTION

The present invention relates to visitor verification generally and, more particularly, to an eReceptionist and eNeighborhood watch system for crime prevention and/or verification.

BACKGROUND OF THE INVENTION

Crime statistics show most burglars visit the front door first before attempting to enter a premise. Statistics show 72.4% of burglaries occur when the premise is unoccupied (National Crime Survey, 2003-2007). Most burglars scout for easy targets. When victimized homes are occupied by women alone, homes are targeted more often.

Conventional crime prevention solutions are passive and offer little crime prevention value. Conventional solutions include outdoor security cameras, signs, and decals from traditional alarm companies. The effectiveness of conventional crime prevention solutions is limited because criminals know they have time to take some valuables and leave before police arrive, even if the alarm is triggered. Many burglaries are not considered high priorities for the police and they will not pursue investigation even if video images of the criminals are available.

One alternative is for a homeowner to construct a system with similar functionality. There are security video cameras that can detect motion and send alerts to homeowners and let them view live video. However, such cameras are designed for monitoring, and not designed to deter and prevent criminals. They are missing critical features that make prevention effective.

The disadvantages of current crime prevention solutions are significant. An alarm system only tells the criminals that the police may come in approximately 8 minutes if the alarm is triggered. An alarm system is inconvenient to arm and generates many false alarms. Criminals know that alarm systems are often not armed. Alarm systems also indicate to criminals that often no one is at home and that there are valuables to protect.

Most conventional crime prevention solutions also do not enable easy sharing of collected images, video, and other information among neighbors or other people. For systems that are used for security purposes to detect and record unwanted visitors, privacy and unwanted alerts are major problems for homeowners. Unwanted intruders are rare. Many homeowners do not want video security cameras recording themselves or family members for privacy reasons. Furthermore, providing too many alerts can be a source of annoyance for a user or even result in users ignoring alerts (i.e., potentially missing an important alert such as an intruder).

It would be desirable to implement an eReceptionist and eNeighborhood watch system for crime prevention and/or verification.

SUMMARY OF THE INVENTION

The invention concerns a system comprising a camera sensor, a circuit and an identification device. The camera sensor may be configured to generate video data of an environment. The circuit may be configured to (A) communicate with a network through a wireless connection, (B) provide an electrical connection to (i) a plurality of components and (ii) the camera sensor and (C) enable at least one of (i) the components and (ii) the camera sensor in response to an authentication signal. The identification device may be configured to generate the authentication signal. The plurality of components may be configured to implement a virtual receptionist. The video data may be transmitted to the network. The authentication signal may be transmitted using the network. The notifications may be generated by the components.

BRIEF DESCRIPTION OF THE DRAWINGS

Embodiments of the invention will be apparent from the following detailed description and the appended claims and drawings in which:

DETAILED DESCRIPTION OF THE EMBODIMENTS

Embodiments of the present invention include providing an eReceptionist and eNeighborhood watch system that may (i) deter criminals, (ii) link multiple such services in a neighborhood for an effective virtual neighborhood watch program in a residential and/or business environment, (iii) prevent false alarms by verifying security alarms, (iv) automatically detect visitors, (v) connect with central security monitoring services, (vi) store and update visitor profiles, (vii) learn the behavior of residents, (viii) perform functions based on a scale of urgency, (ix) track users to prevent unwanted notifications and false alarms, (x) communicate with a tracking device, (xi) implement geolocation with a computing device to prevent unwanted notifications and false alarms and/or (xii) be cost effective to implement.

Figure 1:
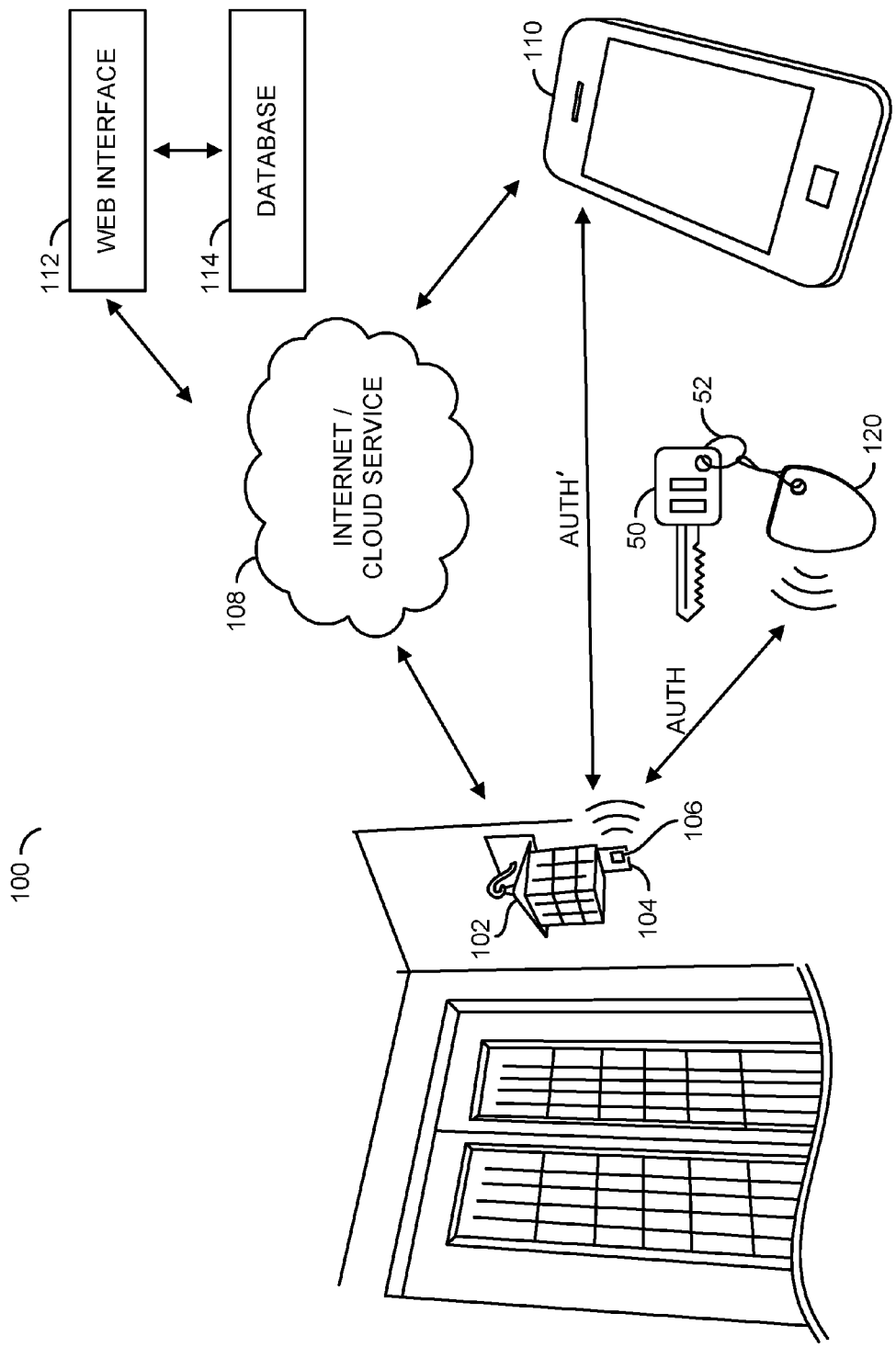
FIG. 1 is a diagram illustrating an example embodiment.

Referring to FIG. 1, a diagram of a system 100 is shown in accordance with a preferred embodiment of the present invention. The system 100 generally comprises a block (or circuit) 102, a block (or circuit) 104, a block (or circuit) 106, and block (or circuit) 108, a block (or circuit) 110, a block (or circuit) 112, a block (or circuit) 114 and/or a block (or circuit) 120. The circuit 102 may be a smart camera system (e.g., a smart security light). The circuit 104 may be a processor sub-module for the smart camera system 102. The circuit 106 may be a communications module. The circuit 108 may be an internet and/or cloud service. The circuit 110 may be a user device. The user device 110 may be a smartphone and/or other personal computing device (e.g., a tablet computing device, a smart watch, a wearable fitness tracker, etc.). The block 112 may be a web interface. The block 114 may be a database. The circuit 120 may implement a tracking device. For example, the tracking device 120 may implement a wireless identification (ID). The wireless ID device 120 is shown connected to keys 50 and/or a keychain 52.

The smart camera system 102 generally comprises the processor sub-module 104. The processor sub-module 104 generally comprises the communications module 106. The communications module 106 may implement Wi-Fi communication and/or Bluetooth communication. The communications module 106 may send data to the internet and/or cloud service 108. In one example, data sent by the communications module 106 to the internet and/or cloud service 108 may then be sent to the user device 110. The user device 110 may be a smartphone. In another example, data sent by the communications module 106 to the Internet and/or cloud service 108 may then be sent to the web interface 112. The web interface 112 may be configured to allow a user to access the database 114. In one example, the web interface 112 may be an app (e.g., a smartphone app). In another example, the web interface 112 may be a website. The database 114 may store images, video, audio, visitor IDs, and/or visitor profiles.

A user may use the smartphone 110 and/or the web interface 112 to send data back to the smart camera 102 through the Internet and/or cloud service 108. Data sent by the user to the internet and/or cloud service 108 may be presented to the communications module 106. The communications module 106 may receive data. The processor sub-module 104 of the smart camera 102 may process data received by the communications module 106. In one example, the homeowner may have an option on the smartphone 110 for quick (e.g., one button) recording and/or sharing of images of unwelcomed visitors to trusted neighbors. The web interface 112 may collect all the shared images and/or manage the database 114 of such images for prevention in the future.

The system 100 may have two major components, an eReceptionist and an eNeighborhood Watch. The eReceptionist system automatically alerts homeowners when there is a visitor at their front door. For example, the smart camera 102 may detect a visitor and send a notification to the homeowner on the smartphone 110 of the homeowner. The eReceptionist enables homeowners to use the smartphone 110, or other devices, to see the visitor at their front doors through a video camera and converse with the visitor through an intercom implemented by the smart security light 102. The web interface 112 and/or the smartphone 110 may allow the homeowner to use the eReceptionist system from any location. If the visitor is unwelcome, the homeowner may proactively deter the unwelcomed visitor. For example, the homeowner may pretend to be at home. If the homeowner does not want to speak with the unwelcomed visitor, the homeowner may forward the video call to "trusted neighbors" to scare off the unwelcomed visitor. If the unwelcomed visitor continues to scout the home and is seen by the homeowner or trusted neighbor through another smart camera 102, the homeowner may announce through the intercom to forcefully ask the intruder to leave. For example, the eReceptionist system 100 may be implemented in an apartment building. Conventional security systems in an apartment building allow a visitor to buzz a resident from outside to be let in and/or speak over an intercom. Conventional security systems in an apartment building may make it difficult and/or unsafe for a resident to verify the visitor. The eReceptionist system 100 may allow automatic verification of visitors.

The eNeighborhood Watch system may enable homeowners to quickly take images, video, and/or audio of an unwelcomed visitor at their front door. The images, video, and/or audio may be shared with a network of trusted neighbors. For example, if a neighbor sees the same unwelcomed visitor at their front door, the neighbor may be in a state of high alert and find ways to prevent a potential burglary.

The communications module 106 may be configured to communicate with the smartphone 110 and/or the wireless ID device 120 using a local connection (e.g., without connecting through the Internet 108). Details of the wireless ID device 120 may be described in association with FIG. 7. The wireless ID device 120 is shown communicating with the smart security light 102. In an example, the communication between the wireless ID device 120 and the smart security light 102 may be a Bluetooth Low-Energy (BLE) connection. The smartphone 110 is shown communicating with the smart security light 102. Details of the smartphone 110 may be described in association with FIG. 6. In an example, the communication between the smartphone 110 and the smart security light 102 may be a geolocation signal (e.g., sent via Wi-Fi). The wireless ID device 120 may send/receive a signal (e.g., AUTH). The smartphone 110 may send/receive a signal (e.g., AUTH'). The signals AUTH and/or AUTH' may be an identification and/or authentication signal.

The smart security light 102 may be configured to prevent (e.g., disable) sending and/or generating notifications to a user and/or recording and/or transmitting video data based on the detection of the signal AUTH and/or the signal AUTH'. In some embodiments, based on the absence of the owner authenticated signal AUTH, the smart security light 102 may enable various sensors and/or features (e.g., an image sensor and/or other input/output modules). In an example, the smart security light 102 may disable notifications when the signal AUTH is detected (e.g., the absence of the signal AUTH may enable notifications and/or video recording). In some embodiments, based on the owner authenticated signal AUTH', the smart security light 102 may disable various sensors and/or features (e.g., an image sensor and/or other input/output modules). In another example, a characteristic of the signal AUTH' detected by the smart security light 102 (e.g., a pre-determined threshold value) may disable notifications (e.g., when the signal AUTH' is a pre-determined distance away notifications and/or video recording may be disabled). The signal AUTH' may provide a distance between the smart security light 102 and the smartphone 110. The response by the smart security light 102 in response to the signal AUTH and/or the signal AUTH' may be varied according to the design criteria of a particular implementation.

Figure 2:
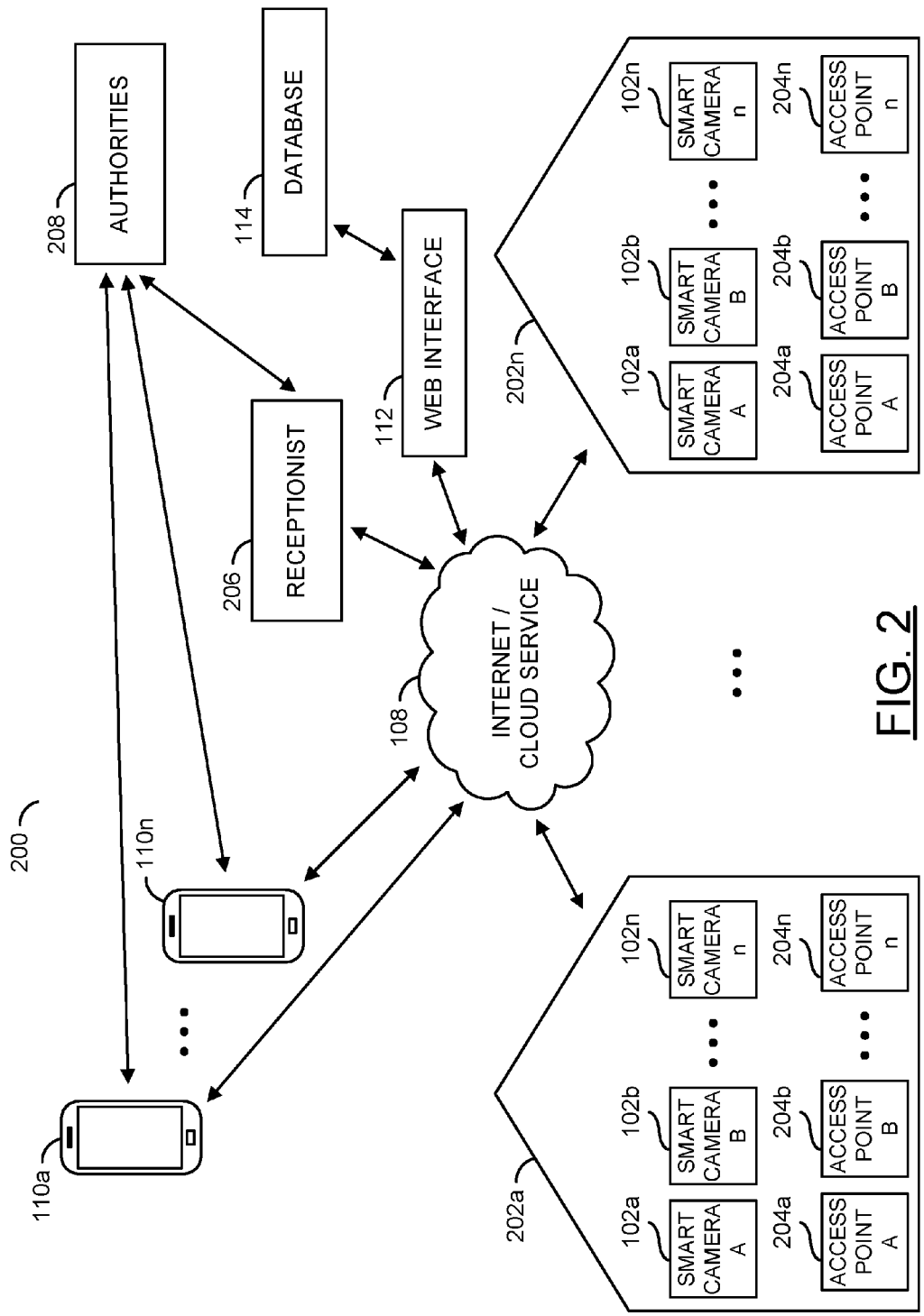
FIG. 2 is a diagram illustrating an example embodiment of an eNeighborhood Watch system.

Referring to FIG. 2, a diagram of a system 200 is shown. The system 200 may be an example embodiment of an eNeighborhood Watch system. The eNeighborhood Watch system 200 generally comprises blocks (or circuits) 102a-102n, the internet and/or cloud service 108, blocks (or circuits) 110a-110n, the web interface 112, the database 114, blocks 202a-202n, blocks 204a-204n, a block (or circuit) 206, and a block (or circuit) 208. The circuits 102a-102n may be smart cameras (e.g., smart security lights). The circuits 110a-110n may be smartphones and/or other personal computing devices. Each of the smartphones 110a-110n may be configured to transmit the signal AUTH' and each signal AUTH' may be associated with a user (e.g., the signal AUTH' may be associated with one of the smartphones 110a-110n and/or be unique to one of the smartphones 110a-110n). The blocks 202a-202n may be homes and/or business premises in a neighborhood. The blocks 204a-204n may be access points to the homes and/or business premises 202a-202n. The smart cameras 102a-102n may be set up at each of the access points 204a-204n of the homes and/or business premises 202a-202n. The block 206 may be a receptionist. In one example, the receptionist 206 may be a virtual receptionist. In another example, the receptionist 206 may be a person from a central monitoring service. The block 208 may represent authorities. The authorities 208 may be the police department, the fire department, an ambulance, and/or other emergency services.

The homes and/or business premises 202a-202n in the eNeighborhood Watch system 200 may have access points 204a-204n. For example, the access points 204a-204n may be doors, windows, garages, other entrances, and/or vantage points. Generally, the smart cameras 102a-102n may be mounted at the access points 204a-204n. Data from the smart cameras 102a-102n at the homes and/or business premises 202a-202n may be sent to the internet and/or cloud service 108.

Data sent to the Internet and/or cloud service 108 may be sent to the user devices 110a-110n. For example, an alert from one of the smart cameras 102a-102n from the home 202a may be sent to the device 110a of the homeowner indicating that another family member has arrived home. In another example, an alert from one of the smart cameras 102a-102n from the home 202n may be sent to the smartphone 102c of an owner of another home (e.g., the owner of the home 202b) that a suspicious person has been identified in the neighborhood. A user may then send a notification to the authorities 208. A user of the user devices 110a-110n may send data back to the smart cameras 102a-102n of the homes and/or business premises 202a-202n through the internet and/or cloud service 108. In one example, a homeowner may send a command to arm an alarm at their home.

In one example, the user devices 110a-110n may be in the possession of trusted volunteers. The trusted volunteers may be other home owners in the eNeighborhood Watch system 200. The trusted volunteers may be the first line of response to a security issue detected by the system 100. Alerts by the system 100 may be sent in parallel to all the trusted volunteers. The trusted volunteers may use available communication channels provided such as cell phones, telephone and/or emails. The homeowner may advise particular pre-defined responses to particular alerts such as calling the authorities 208 (e.g., the police and/or the fire department). The trusted volunteers may be able to activate a set of pre-defined actions using the user devices 110a-110n. The trusted volunteers may take training sessions to learn how to properly respond to various alerts. The training sessions may be taken on-line. The on-line training sessions may be available on the web interface 112.

Data sent to the internet and/or cloud service 108 may be sent to the receptionist 206. For example, if a visitor arrives at one of the homes 202a-202n and nobody is home, the receptionist 206 may be able to communicate with the visitor through one of the smart cameras 102a-102n. In one example, the receptionist 206 may be able to make the visitor believe that a family is home when the family is on vacation. The receptionist 206 may be able to alert the authorities 208. For example, if an alert is sent to the receptionist 206 that a suspicious visitor is near one of the homes 202a-202n the receptionist may be able to verify that the visitor is a burglar and notify the authorities 208. For example, there is a growing trend of police forces not responding to unverified alarms. Verification of burglars by the receptionist 206 may prevent false alarms being sent to the authorities 208.

In one example, the receptionist 206 may not be the first line of response. For example, the trusted volunteers may be the first line of response. The receptionist 206 may be a backup service to other security services. The receptionist 206 may respond to alerts from the system 100 if none of the trusted volunteers are available after a preset amount of time. The receptionist 206 may invoice the homeowner for any services rendered. The receptionist 206 may be personnel for the central monitoring service. The central monitoring service may offer a range of services. For example, the range of services offered by the central monitoring service may include a virtually free service, and/or a state-of-the-art monitoring service. The central monitoring service may supplement free and/or virtually free alert services implemented by the system 100.

Data sent to the Internet and/or cloud service 108 may be sent to the database 114. The web interface 112 may allow a user to access the database 114. The web interface 112 may be accessed using the smartphones 110a-110n and/or other user devices. The database 114 may store images, videos, audio, visitor IDs, and/or visitor profiles sent from the smart cameras 102a-102n on the premises 202a-202n. For example, the database 114 may be accessible by all users in the eNeighborhood Watch system 200. In another example, the database 114 may provide different levels of access for different members of the eNeighborhood Watch system 200. For example, all members of the eNeighborhood Watch system 200 may have access to videos, images, and/or visitor profiles of a potential burglar. However, a member of one home may not want another member of the eNeighborhood Watch system 200 to view the profile of a family member and/or friend.

If the network of trusted neighbors 202a-202n has the same system, they may exchange images, video, and/or other information of unwelcomed visitors. The website and/or web interface 112 may have the database 114 to manage the images, video, and/or other information. Unwelcome visitors stored in the database 114 may be shared with other neighbors and/or the authorities 208 using the web interface 112. For example, when the unwelcomed visitors learn about the database 114 they may not target the neighborhood 202a-202n.

The database 114 may store and/or manage a "whitelist" of known and trusted individuals circulating through the neighborhood 202a-202n. For example, children going door to door for a school activity may be on the whitelist. The whitelist may allow neighbors, the authorities 208, and/or other relevant parties know that visitors on the whitelist may be in the neighborhood 202a-202n. For example, the visitors from the whitelist may be trusted and/or watched for to increase their safety. The whitelist may include residents and/or approved friends. The database 114 may collect images and/or IDs of visitors from the whitelist (e.g., based on the smartphones 110a-110n, wireless device 120 and/or input using the web interface 112). Information from the database 114 and new information from the smart cameras 102a-102n may improve categorization of visitors. Various responses may be programmed into the smart cameras 102a-102n. The responses to visitors on the whitelist may be based on a scale of urgency. For example, a visitor on the whitelist may get a response of a personal greeting.

The database 114 may also contain a "blacklist" of known untrusted visitors. The blacklist may include suspicious visitors from prior visits, visitors that appear on a wanted list from the authorities 208, etc. The smart cameras 102a-102n may collect images, videos, and/or IDs from visitors that appear on the blacklist. The smart cameras 102a-102n may send updated images, videos, and/or IDs to the database 114 for improved categorization and/or profile updating. The blacklist may be used to determine a response to a visitor. The response to a visitor on the blacklist may be based on the scale of urgency. For example, a visitor on the blacklist may receive warnings and/or deterrents. Deterrents may include pre-recorded messages, disguising the voice of a person, sirens, flashing lights, smoke, and/or tear gas.

Multiple levels of alerts may be implemented to distinguish unwelcomed visitors from welcomed visitors (e.g., household members). Since most visitors may be welcomed, identifying strangers and raising the level of alert for immediate attention may be important. The technology to identify welcomed visitors may include facial recognition, voice recognition, machine learning of habits and schedules of household members, and/or user inputs when errors occur. Learned behavior may be used to determine which pre-defined function to perform. For example, the learned behavior may determine that nobody is home at a particular time, and the pre-defined function may be to automatically arm the security system and/or perform energy saving functions (e.g., adjust the heating and/or cooling of a home).

In another example, the daily schedule of inhabitants may be observed and/or recorded. The daily schedule of inhabitants may be learned using various sensors. For example, patterns may be observed such as daily energy use requirements at a certain time of day and/or the arming/disarming of a security system. In another example, smart lighting may estimate the amount of lighting needed at a particular time of day based on the occupants in a home. The signal AUTH or (AUTH') may be used to determine when members of the household arrive/depart. If nobody is home, the system 100 may determine that exterior lighting is needed and/or interior lighting is not needed. In another example, if a family is on vacation the system may turn on interior lighting to make it appear to a potential burglar that the home is occupied. The learned behavior may develop a unified status of the home (e.g., based on occupancy, time of day, weather, security status, etc.). For example, the data from the various authentication signals received from members of a household may be aggregated (e.g., collected, compared, time stamped, etc.) to determine the unified status of the home. Pre-defined functions may be performed based on the unified status of the home.

Multiple camera detection technology in combination with the smart cameras 102a-102n may be implemented to identify un-authorized trespassers. For example, if a visitor stops by multiple doors of the same house the visitor is likely an unwelcomed trespasser. Using separate smart cameras 102a-102n at the access points 204a-204n, computer vision technology, and/or machine learning technology, the system 200 may accurately identify unwelcomed trespassers, alert the authorities 208, and/or alert the homeowners.

Notifications may be generated by the smart security light 102. In an example, the notifications may be a text message (SMS), an e-mail, a phone call, an application notification (e.g., for Apple and/or Android smartphones), an operating system notification (e.g., for Windows, iOS, Linux), etc. In another example, the notification may be a recorded message output by the smart security light 102 (e.g., a greeting that is played to a visitor). In some embodiments, the notifications may be generated in response to object detection performed by the smart security light 102. In an example, the smart security light 102 may detect a visitor (e.g., a person) that can be seen in the video data using video analysis and/or object recognition. In another example, the smart security light 102 may detect an event has occurred (e.g., a person has been loitering near the home 202a, a burglar has broken into the home 202a, a delivery person has delivered a package at the access point 204a, etc.) in the video data.

One or more components of the smart security light 102 may be implemented to generate the notifications and/or operate as a virtual receptionist (e.g., a speaker, the communication module 106, LEDs, etc.). The authentication signal AUTH may disable and/or enable one or more components (or one or more features of the components) of the smart security light 102. The authentication signal AUTH may be interpreted (e.g., processed) by a processor of the smart security light 102 to determine which control signals to activate the components of the smart security light 102 (e.g., which instructions to provide to which component). In an example, the signal AUTH may be processed by the processor, the processor may determine that the notification (e.g., a notification pushed to the smartphone 110) should not be sent, and the processor may generate a control signal that does not provide instructions to the communication module 106 for communicating the notification.

Using the signal AUTH (or AUTH'), the smart security light 102 may have more information to determine when notifications are transmitted. For example, fewer notifications may be delivered. The signal AUTH may be implemented to determine which notifications may be relevant (e.g., desired by the user) and which notifications may not be relevant (e.g., not important to the user). By determining which notifications are relevant, few false alarms may be presented to the receptionist 206 and/or the authorities 208. For example, if the object detection performed by the smart security light 102 determines a visitor is a loiterer, a notification may be presented to the receptionist 206. However, the loiterer may be a friend visiting. The wireless ID device 120 may identify the visitor as a friend and the notification (e.g., a false positive) may not be transmitted.

Using the signal AUTH (or AUTH'), the smart security light 102 may allow a user to control an amount of privacy. For example, a homeowner may not want to be recorded all the time and/or have the recordings stored in the database 114. Furthermore, limiting the amount of recordings transmitted from the smart security light 102 to the network 108 may prevent excessive data usage (e.g., bandwidth and/or capacity caps imposed by internet service providers and/or cell phone carriers).

In some embodiments, the object detection performed by the smart security light 102 may over-ride the settings and/or preferences associated with the signal AUTH (or AUTH'). For example, the user carrying the wireless ID device 120 may have a configuration setting for disabling alerts sent to the authorities 208 and/or the receptionist 206 when the signal AUTH is detected by the smart security light 102. However, if the object detection detects a second visitor the notification (or alert to the receptionist 206 and/or the authorities 208) may be generated even though the signal AUTH is detected (e.g., a situation where the homeowner answers the front door when a visitor knocks on the door may not be disabled by the signal AUTH). In another example, if the object detection detects one or more predetermined objects (e.g., a weapon, blood, a person clutching their chest, etc.) the notification may be generated even when the signal AUTH (or AUTH') indicates the notification should not be sent. The object detection of the video data may be performed separately from the recording and/or uploading of the video data. For example, the smart security light 102 may analyze (e.g., perform the object detection) without storing the video data long-term (e.g., uploading the video data to the database 114).

Figure 3:
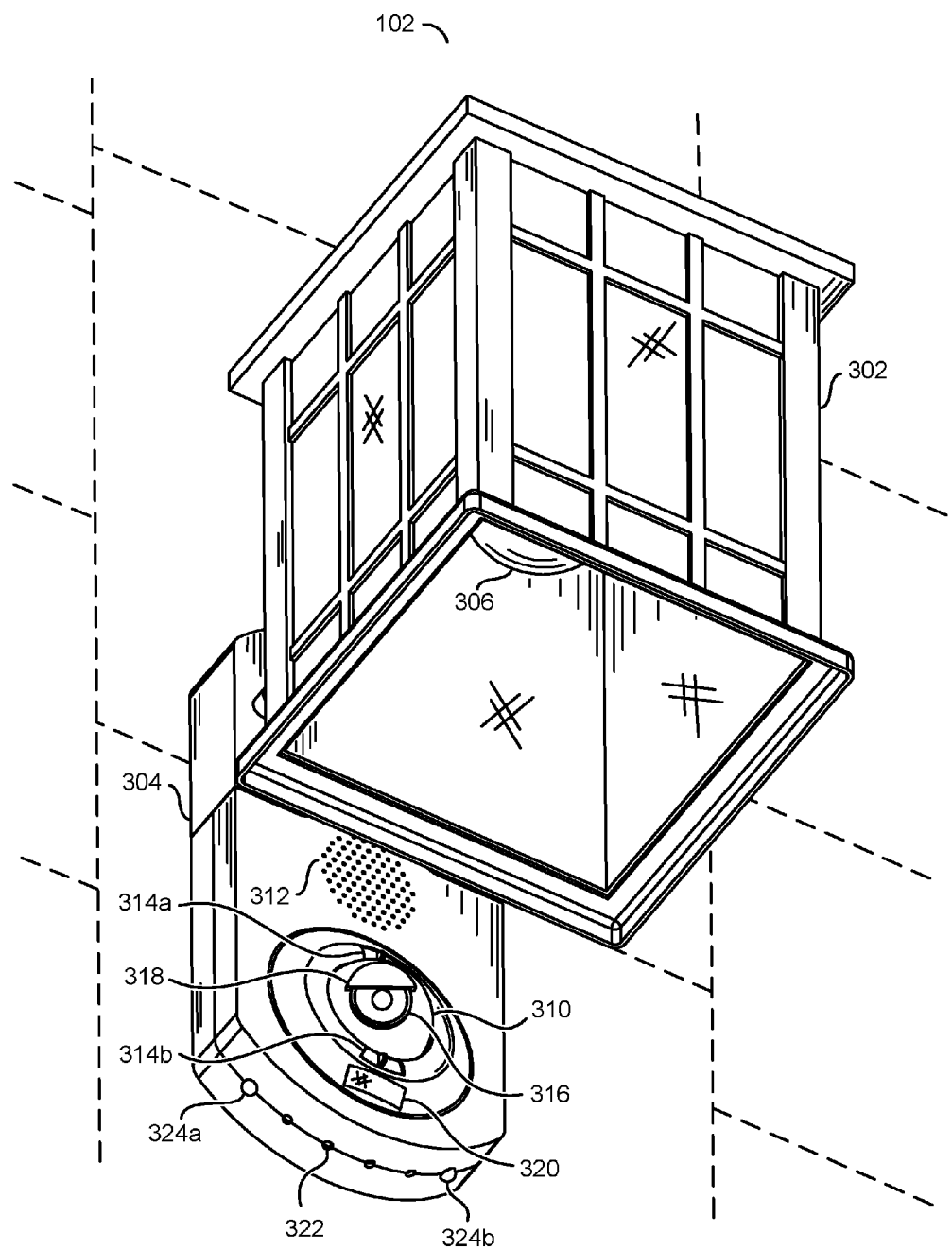
FIG. 3 is a diagram illustrating an embodiment of a smart security light.

Referring to FIG. 3, a diagram illustrating a security light 102 implementing an embodiment of the present invention is shown. The security light 102 may be the smart security IP camera. The smart security light 102 may comprise a light shade 302 and the base 304. The base 304 may comprise a lens module 310, a speaker grille 312, adjustment grips 314a-314b, an IR sensor lens 320, a microphone grille 322, and indicator LEDs 324a-324b. The lens module 310 may comprise a lens 316 and a lens cover 318.

The smart security light 102 may further optionally comprise a light bulb 306. The light bulb 306 may be replaceable. The light bulb 306 may be implemented using an incandescent light bulb, a compact fluorescent lamp (CFL) bulb and/or an LED bulb. The type and/or style of the light bulb 306 may be varied according to the design criteria of a particular implementation.

The smart security light 102 may be implemented as a light fixture. The smart security light fixture 102 may be configured to mount to a wall and/or ceiling mount. The smart security light fixture 102 may be configured to connect to existing electrical wiring. For example, the smart security light fixture 102 may be mounted to an electrical box (e.g., a junction box) that provides wiring to the electrical system of a premises.

The lens module 310 may be configured to capture video data. For example, the lens module 310 may implement a 720P HD video camera. The video data may be high-resolution video frames and/or audio data. The quality of the video data may be varied according to the design criteria of a particular implementation. Generally, the quality of the video data is enough to support object detection (e.g., facial recognition, motion detection, object identification, tagging, etc.).

Figure 4:
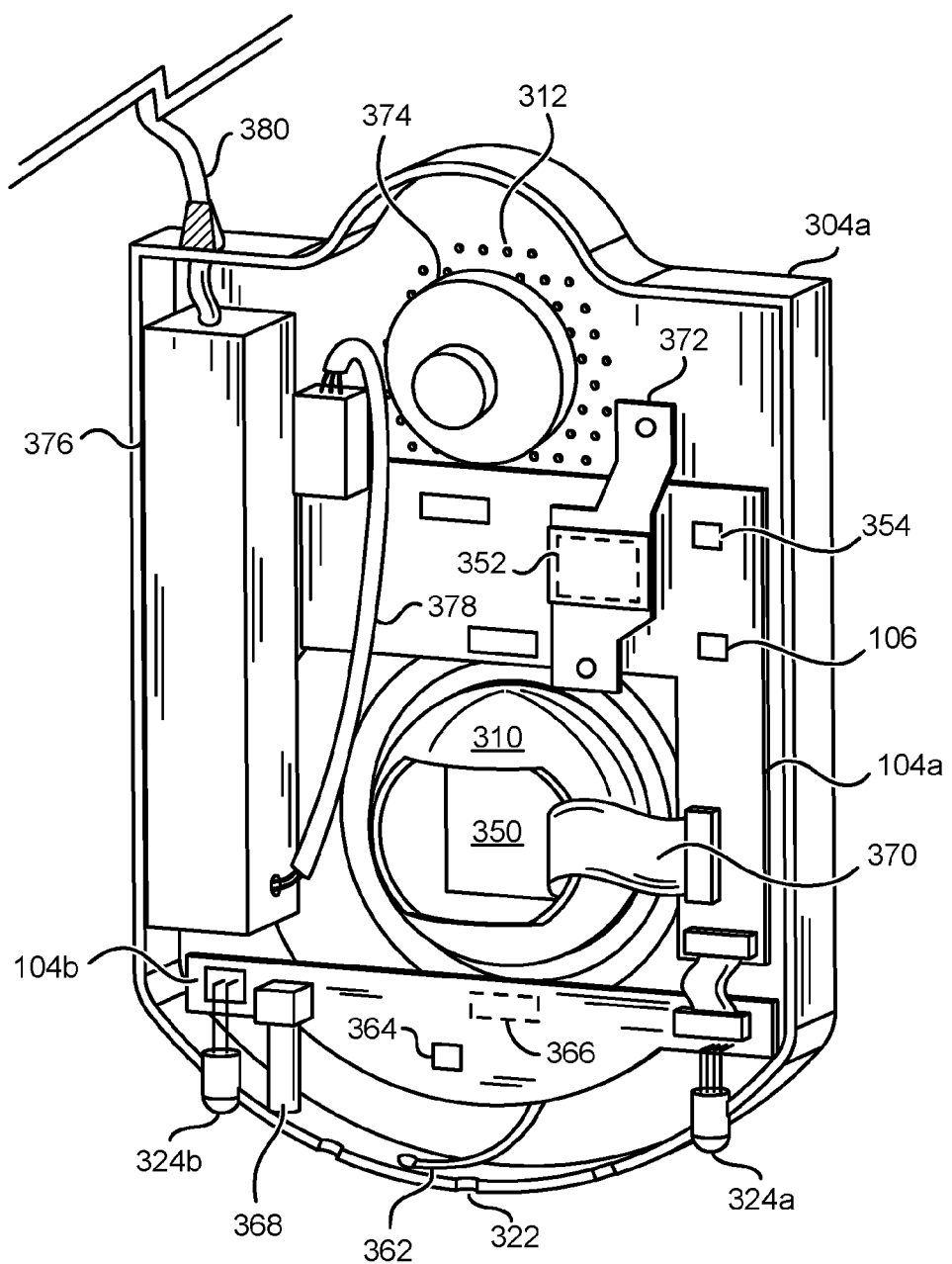
FIG. 4 is a diagram illustrating a rear view of the internal components of a security light.

Referring to FIG. 4, a rear view of the internal components of the security light 102 implementing an embodiment of the present invention is shown. A backside of a front portion 304a of the base 304 is shown. A camera sensor 350 is shown in the lens module 310. A processor 352 is shown. Circuit boards 104a-104b are shown. In an example, the circuit board 104a may be a processor module (e.g., the processor sub-module). A memory 354 is shown on the circuit board 104a. The circuit boards 104a-104b may provide electrical connections to one or more of the various components of the smart security light 102.

The circuit boards 104a-104b may be configured to enable/disable one or more of the various components of the smart security light 102. In an example, the various components of the smart security light 102 implemented using the circuit boards 104a-104b may be configured to implement a virtual receptionist. The virtual receptionist may be configured to execute a response to an event (e.g., a detected individual arriving) based on the signal AUTH. For example, the signal AUTH may identify an individual as a friendly visitor and the components of the circuit boards 104a-104b may be configured to generate a friendly greeting.

The circuit board 104a is shown as an L-shape (e.g., configured to fit around the lens module 310). The circuit board 104a is shown comprising the processor 352 and the communication module 106. For example, the communication module 106 may be a Wi-Fi circuit. In another example, the communication module 106 may be a Bluetooth circuit. The communication module 106 may be connected to an antenna 362. For example, the antenna 362 may be a flexible Wi-Fi antenna. The Wi-Fi antenna 362 may be held in place (e.g., glued) to a bottom of the base 304. The circuit board 104a may comprise other internal components of the light fixture 102. For example, the circuit board 104a may comprise a Bluetooth antenna (e.g., a Bluetooth antenna may be positioned on the other side of the circuit board 104a).

The circuit board 104b is shown connected to the circuit board 104a. The circuit board 104b is shown connected to a microphone 364, an IR sensor 366, the indicator LEDs 324a-324b and a reset button 368. The arrangement of the components and/or the type of components of the circuit board 104b may be varied according to the design criteria of a particular implementation.

The lens module 310 is shown having an opening. The opening may allow a cable 370 to connect the camera sensor 350 to the circuit board 104a. The cable 370 may be configured to transmit the video data captured by the camera sensor 350 and/or provide electrical connections to the circuit board 104a. In response to the authentication signal AUTH (or AUTH'), the circuit board 104a may be configured to enable/disable the camera sensor 350 using the cable 370. For example, the cable 370 may be a high-speed, low-noise flexible cable. The circuit board 104a may transmit the video data from the cable 370 to the processor 352.

The processor 352 is shown under a heatsink 372. A speaker 374 is shown connected to the circuit board 104a. A power adapter 376 is shown connected to the processor module 104a. A cable 378 is shown connecting the power adapter 376 to the processor module 104a. The cable 378 may transmit supply power converted by the power adapter 376 to the processor module 104a (and the lens module 310). The cable 378 may transmit the control signals from the processor 352 to the power supply 376. For example, the cable 378 may transmit DC signals between the power supply 376 and the circuit boards 104a-104b to enable/disable the components of the smart security light 102. The power adapter 376 may convert the control signals from the processor 352 to be compatible with the light bulb 302 and/or other external devices such as security response devices. For example, the power adapter 376 may convert external power received from a cable 380 to provide power to the circuit boards 104a-104b via the cable 378. In another example, the power adapter 376 may convert signals received from the circuit boards 104a-104b via the cable 378 to provide power to external devices such as the security response devices via the cable 380.

The communication module 106 may be configured to connect to a local network and/or the wide area network 108 (e.g., the internet). In some embodiments, the communication module 106 may be configured to implement one or more types of communications protocols. For example, the communication module 106 may support a Wi-Fi connection and/or a Bluetooth connection. In some embodiments, the communication module 106 may be distributed as multiple circuits on the circuit boards 104a-104b (e.g., a processing chip for each communications protocol). Other types of communications protocols may be implemented according to the design criteria of a particular implementation. In some embodiments, the communication module 106 may implement the Bluetooth connection to connect to the user device 110 (e.g., a smartphone) to provide an interface for configuring the light fixture 102 (e.g., to allow the user to input local network settings). In some embodiments, the communication module 106 may implement the Wi-Fi connection to connect to a cloud service via the internet.

In some embodiments, the communication module 106 may be configured to connect to one or more networks. For example, the communication module 106 may connect to one network (e.g., a wide area network) to transmit the video data and another network (e.g., a local network) to transmit the authentication signal AUTH. In one example, a Wi-Fi connection by the communication module 106 may be implemented (e.g., using the network 108) to transmit the video data and/or transmit other data between the smart security light 102 and the database 114 and the signal AUTH may be transmitted using Bluetooth communication implemented by the communication module 106 (e.g., a short-range connection between the smart security light 102 and the wireless ID device 120). The number and/or types of networks implemented may be varied according to the design criteria of a particular implementation.

In some embodiments, the smart light fixture 102 may be configured to upload data (e.g., the captured video data) to the cloud service 108 and/or the database 114. For example, the data uploaded to the cloud service 108 may be streamed to the user device 110. The user device 110 may connect to the cloud service 108 to allow the user to request the stored video data. For example, the video data may be sent to the user device 110 as a live (or nearly live) video stream. The data traffic to/from the cloud services may be encrypted (e.g., AES 128-bit encryption, AES 256-bit encryption, etc.). User account passwords may be salted and hashed with a cryptographic hash function.

In some embodiments, the smart security light fixture 102 may store the captured video data (e.g., in the memory 354). In some embodiments, the video data may be uploaded to the cloud service 108 and/or the database 114. Generally, the cloud service 108 and/or the memory 354 may have a limited storage capacity. In some embodiments, the light fixture 102 may analyze the captured video data (e.g., using the processor 352) and/or data from the IR sensor 366 to perform a particular type of detection. For example, the light fixture 102 may detect objects, motion and/or visitors within in an area of interest. The smart security light fixture 102 may initiate storage of the video data in response to the particular type of detection. The detection performed by the smart security light fixture 102 may be used to detect objects approaching the premises.

The lens module 310 is shown attached to the modular universal base 304. However, the lens module 310 may be implemented as a sub-module and may be separately mounted to allow different viewing angles as desired by the user.

Figure 5:
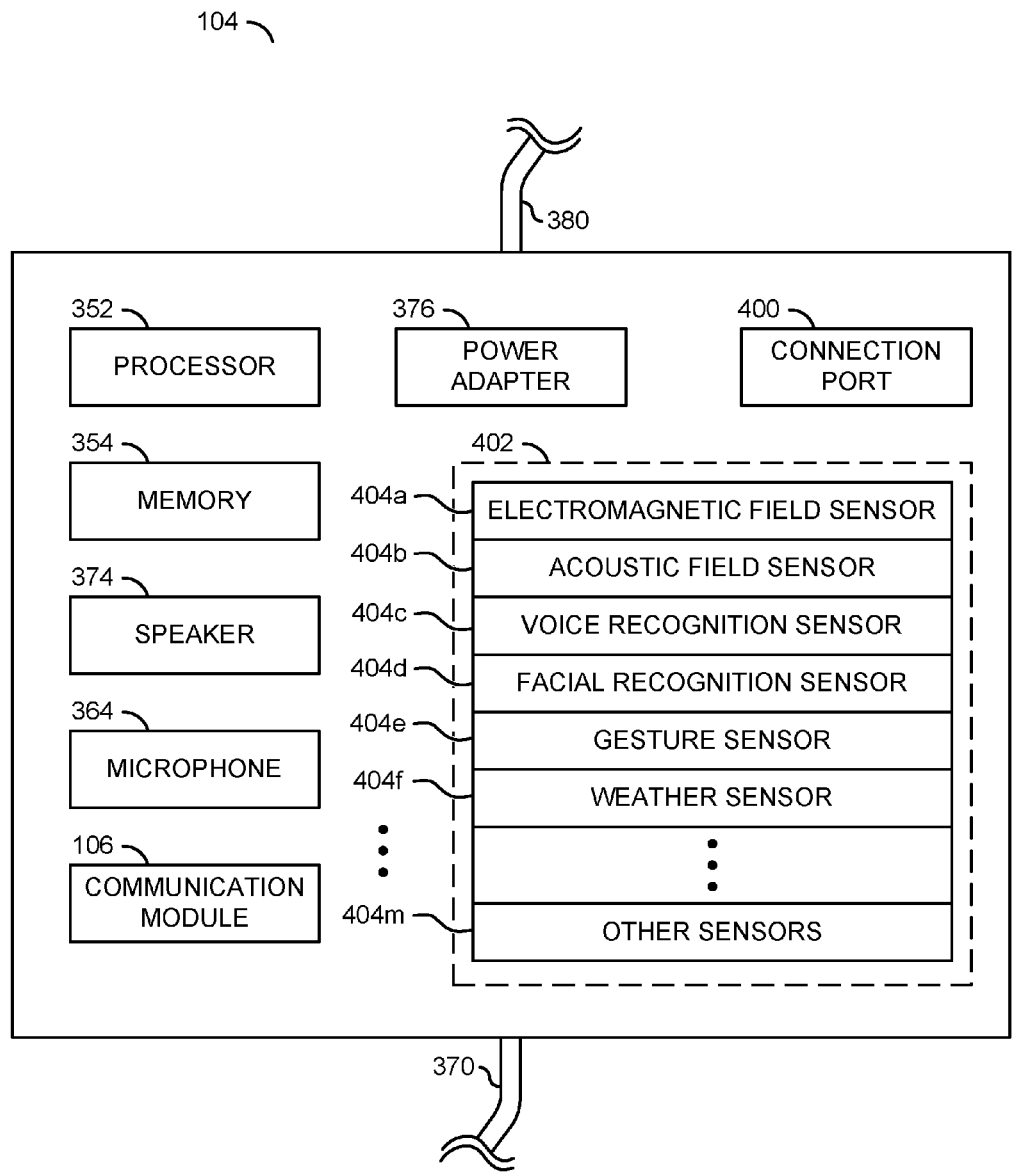
FIG. 5 is a diagram illustrating an embodiment of a processor sub-module.

Referring to FIG. 5, a detailed illustration of the processor sub-module 104 is shown. In some embodiments, the processor sub-module 104 may be mounted separately from the base 304 of the light fixture 102 and/or the lens module 310. The processor sub-module 104 generally comprises the communication module 106, the processor 352, the memory 354, the speaker 374, the microphone 364, the power adapter 376, a block (or circuit) 400 and/or a block (or circuit) 402. The processor sub-module 104 may comprise other components (not shown). In some embodiments, the processor sub-module 104 may further comprise the lens module 310.

The circuit 400 may be configured as a connection port. The connection port 400 may be configured to provide an interface to a wired connection (e.g., USB, Thunderbolt, Ethernet, etc.). The connection port 400 may be configured to provide wired communication (e.g., data transfer) and/or provide power (e.g., from the power adapter 376). In an example, the processor module 104 may receive an AC power supply, the power adapter 376 may convert the AC power supply to a DC voltage (e.g., 5V) and the connection port 400 may provide the DC voltage to other components via a wired connection. In some embodiments, the connection port 400 may be implemented to perform initial set up (e.g., network settings) and/or apply updates (e.g., firmware updates). The implementation of the connection port 400 may be varied according to the design criteria of a particular implementation.

The circuit 402 may be implemented as a sensor I/O block. The sensor I/O block 402 may include a number of sensor modules 404a-404m. The sensor modules 404a-404m may include an electromagnetic field sensor, an acoustic field sensor, a voice recognition sensor, a facial recognition sensor, a gesture sensor, a weather sensor, a passive infrared sensor, an active infrared sensor, a sonar sensor, a contact sensor, a smoke sensor, a radio-frequency identification (RFID) sensor, and/or other security system sensors. The processor sub-module 104 is shown with the cable 370 to connect to the lens sub-module 310. However, the lens sub-module 310 may be implemented as a lens module on the processor sub-module 104 as part of the sensor I/O block 402.

The smart security light 102 may be used to implement the virtual receptionist. For example, the components of the smart security light 102 (e.g., the processor 352, the memory 354, the antenna 362, the IR sensor 366, the LEDs 324a-324b, the microphone 364, the communication module 106, the speaker 374, the processor sub-module 104a-104b, the sensor modules 404a-404m, etc.) may implement the virtual receptionist. The virtual receptionist may detect a visitor, determine an appropriate response and/or implement the response with or without contacting the homeowner (or another user). In an example, the response may be to use the speaker 374 to playback a pre-recorded message (e.g., in a disguised voice). In another example, the response may be to implement a 2-way communication between the homeowner (e.g., using the smartphone 110) and the speaker 374 and the microphone 364 at the smart security light 102. In yet another example, the response may be to use the speaker 374 to sound a loud alarm and/or use the communication module 106 to contact the authorities 208.

The appropriate response by the virtual receptionist may be determined by the processor 352. In one example, the appropriate response may be based on image analysis performed using images captured by the lens module 310, object detection and/or event detection. In another example, the appropriate response may be determined based on the scale of urgency. In yet another example, the appropriate response may be determined based on the signal AUTH (or AUTH'). In still another example, the appropriate response may be based on information stored in the database 114. The appropriate response by the virtual receptionist may be used to welcome desired guests (e.g., friends, family, domestic employees, etc.) and/or deter undesired visitors (e.g., solicitors, loiterers, criminals, etc.). The appropriate response by the virtual receptionist may be selected based on the circumstances. The responses available may be varied according to the design criteria of a particular implementation.

The processor sub-module 104 may be configured to implement voice impersonation technology during real time two-way intercom communication. For example, to deter a potential burglar making the potential burglar believe there is a physically strong person at the house may be important. Burglary statistics show that females at home are much more likely to be burglarized than males at home. The voice impersonation technology may be implemented with the smartphone 110 and/or a 2-way intercom system inside the home for the purpose of deterring potential burglar. The memory 354 may store voice data for a preferred voice type. The impersonated voice may be transmitted using the speaker 374. In another example, pre-recorded background voices and/or sound may be added to the voice of the homeowner and/or trusted neighbors during an intercom session with the visitor. Adding additional voices and/or sound may be used to make a potential burglar believe there are multiple people in the house. The activation of voice impersonation, adding additional voices, and/or adding additional sounds may be selected quickly and/or be a preset option.

Pre-recorded voice messages stored in the smart camera 102 may deter an unwelcomed visitor. The message may be activated upon detection of an unwelcomed visitor, based on the database 114 of welcome visitors. In one example, the message may be a custom recording by the homeowner. In another example, the voice may be from the authorities 208, such as the voice of a local police sheriff. The voice recording may be recorded using the microphone 364. The voice recording may be stored in the memory 354. The voice recording may be transmitted with the speaker 374.

The processor sub-module 104 (e.g., the circuit boards 104a-104b) and the lens sub-module 310 may be connected with the cable 370. In some embodiments, the cable 370 may be external to the base 304. Separating the processor sub-module 104 and the lens sub-module 310 may allow the modules to easily attach to various light fixture styles and/or allow for alternate placement locations (e.g., to improve sensing capabilities and/or provide better camera angles).

Figure 6:
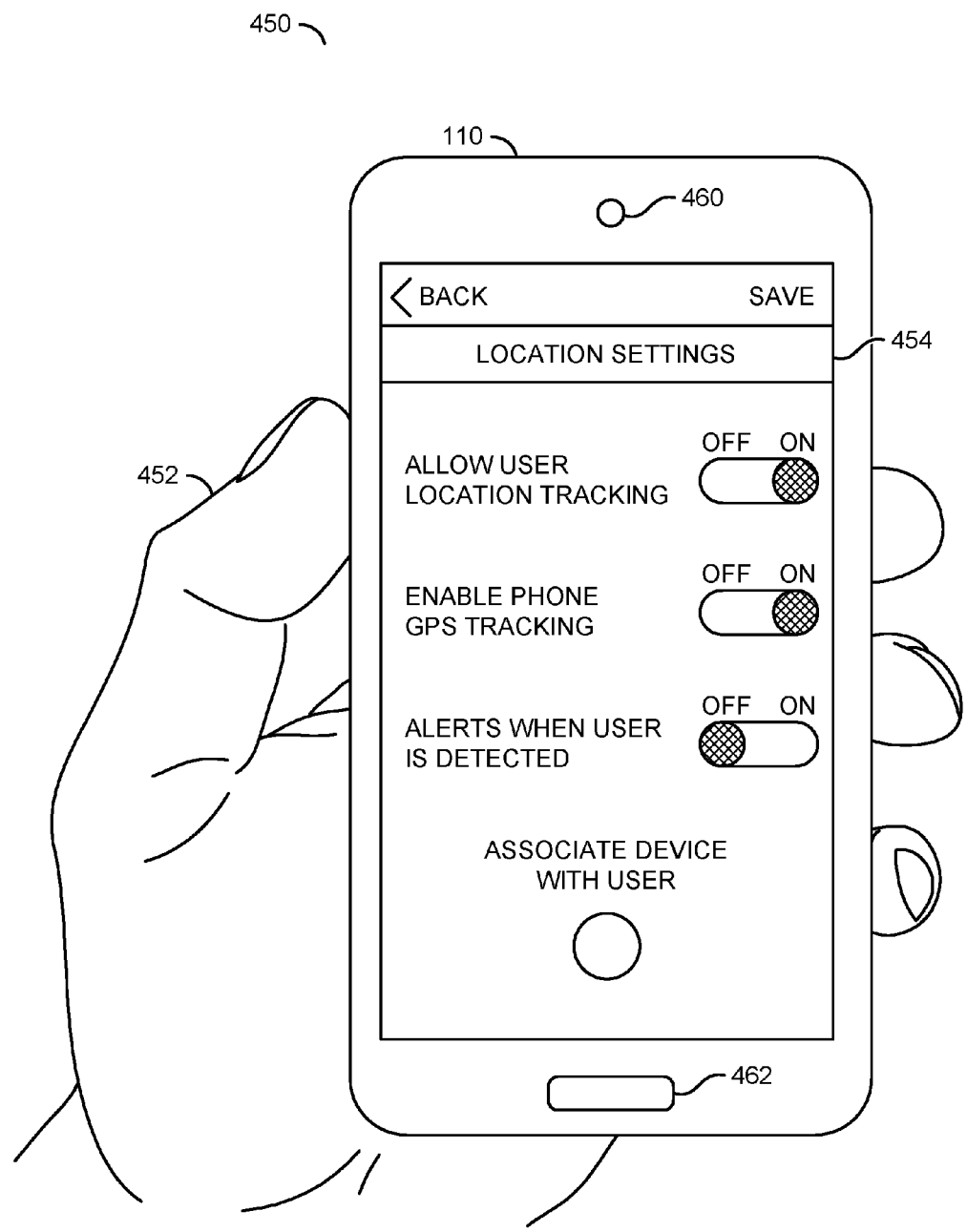
FIG. 6 is a diagram illustrating an application for a computing device implementing locating tracking.

Referring to FIG. 6, a system 450 illustrating an application for a computing device implementing locating tracking is shown. A user (e.g., homeowner) 452 is shown holding the smartphone 110. The smartphone 110 is shown running (e.g., displaying) an interface 454. The interface 454 may be a portion of an application. For example, the interface 454 may be an example of a location settings and/or a location tracking settings portion of the application. The application may be configured to run on the smartphone 110 and/or another computing device (e.g., a desktop computer, a laptop computer, a notebook computer, a tablet computing device, a smart watch, etc.). The implementation of the application and/or the arrangement of the interface 454 may be varied according to the design criteria of a particular implementation.

The smartphone 110 is shown comprising a smartphone speaker 460 and a smartphone microphone 462. The smartphone speaker 460 may be used to implement the notification and/or the virtual receptionist. For example, the notification may have an audio component (e.g., a ringtone, a chime, etc.). The smartphone microphone 462 may be used to respond to the notification. For example, the user 452 may speak to a visitor using the smartphone microphone 462 and the voice of the user 452 may be played back through the speaker 374 of the smart security light 102.

The location settings interface 454 may comprise various options (settings). The options may be configurable by the user 452. The options may be selected to control if and how the smart security light 102 detects the signal AUTH. In the example shown, some of the options are presented as toggle switches (or radio buttons) enabling the user to toggle the option on or off.

In an example, one of the options of the location settings interface 454 may allow the user 452 to enable user location tracking. Allowing the user location tracking may enable the smartphone 102 to determine the location of the user 452 based on the signal AUTH (e.g., using the wireless ID device 120) and/or the signal AUTH' (e.g., using geolocation with the smartphone 110). To provide the user 452 with privacy, the smart security light 102 may not track the user when the user 452 turns off the option to allow user location tracking. In another example, the location settings interface 454 may provide an option to enable phone GPS tracking. Enabling phone GPS tracking may allow the smart security light 102 to track the smartphone 110 of the user 452 using the signal AUTH' (e.g., perform geolocation). If the user 452 disables phone GPS tracking, the smart security light 102 may track the location of the user 452 based on the location of the wireless identification device 120 (e.g., using a Bluetooth connection).

In still another example, the location settings interface 454 may provide an option to enable alerts when the user 452 is detected. When alerts are enabled, the smart security light 102 may transmit the notification to the user 452 (e.g., on the smartphone 110) even though the signal AUTH and/or AUTH' is detected. Disabling user alerts when the user 452 is detected may disable the notifications. In some embodiments, additional options may be available. Additional options may provide more control over the type and/or frequency of the notifications and/or the components of the smart security light 102 that are disabled/enabled when the signal AUTH and/or AUTH' is detected. The options provided by the location settings interface 454 may be varied according to the design criteria of a particular implementation.

The location settings interface 454 may provide a button to associate a device with the user 452. For example, pressing the button may be used to associate the wireless ID device 120 with the user 452. For example, the smart security light 102 and/or the smartphone 110 may pair with the nearby wireless ID device 120. In another example, the wireless ID device 120 may have a button to communicate with the smartphone 110 when the option is selected.

The location settings interface 454 may provide an option for the user to select the pre-determined distance to enable/disable the components of the smart security light 102 based on the geolocation performed for the smartphone 110. In an example, the signal AUTH' may be used to determine a distance between the smart security light 102 and the smartphone 110 (e.g., the identity and/or location of the user 452 may be inferred from the smartphone 110). In some embodiments, the signal AUTH' may be based on the distance of the smartphone 110 from the smart security light 102. In some embodiments, the smart security light 102 may determine the distance to the smartphone 110 based on the signal AUTH'. In an example, the user may select a distance of 10 feet for the pre-determined distance, and if the smart security light 102 determines, from the signal AUTH', that the smartphone 110 is within 10 feet, one or more components of the smart security light 102 may be disabled. When the signal AUTH' indicates that the smartphone 110 is greater than 10 feet away, the components of the smart security light 102 may be enabled (e.g., notifications may be sent). The value of the pre-determined distance may be varied according to the design criteria of a particular implementation.

The geolocation performed by the eReceptionist system 100 may perform an identification of a real-world geographic location of the smartphone 110 (or the wireless ID device 120) and/or a relative location of the wireless ID device 120 and/or smartphone 110 (e.g., relative to the smart security light 102). In some embodiments, the eReceptionist system 100 may determine the location of the smartphone 110 (or the wireless ID device 120) using GPS coordinates. For example, the signal AUTH' may be generated based on a range of GPS coordinates. In some embodiments, the eReceptionist system 100 may determine the location of the smartphone 110 (or the wireless ID device 120) using a reference location (e.g., a street address, an intersection, a landmark, etc.). For example, geolocation may be used to determine whether the smartphone 110 is at a particular intersection and the signal AUTH' may be generated based on whether or not the smartphone is within a distance between the smart security light 102 and the intersection. For example, the location settings interface 454 may provide an interactive map (e.g., a Google Maps API) and the user 452 may select streets and/or intersections to indicate a range for enabling/disabling components of the smart security light 102.

The geolocation performed by the eReceptionist system 100 may be configured to determine a position and/or location of one or more of the smartphones 110a-110n and/or the wireless ID device 120 (e.g., whether stationary or moving). In some embodiments, GPS may be implemented to determine localization for geolocation. In some embodiments, the geolocation may be performed by a third party, the localization information determined by the third party may be presented to the smartphone 110 and the smartphone 110 may present the localization data to the smart security light 102 (e.g., the signal AUTH'). In some embodiments, multilateration of radio signals between cell towers (e.g., the network 108) may be performed to determine localization data for geolocation. To perform multilateration of radio signals, the smartphone 110 (or the wireless ID device 120) may be configured to emit a roaming signal to contact a nearby antenna tower (e.g., to determine a signal strength of the smartphone 110 and/or wireless ID device 120 to the nearby antenna). In an example, the location settings may prevent one or more of the geolocation techniques (e.g., to address potential privacy concerns a user may have). By using the location of the smartphone 110 and/or the wireless ID device 120, the eReceptionist system 100 may approximate the location of the user 452 (e.g., the smartphone 110 and/or the wireless ID device 120 may be used as a proxy for the location of the user 452). The implementation of the geolocation may be varied according to the design criteria of a particular implementation.

Figure 7:
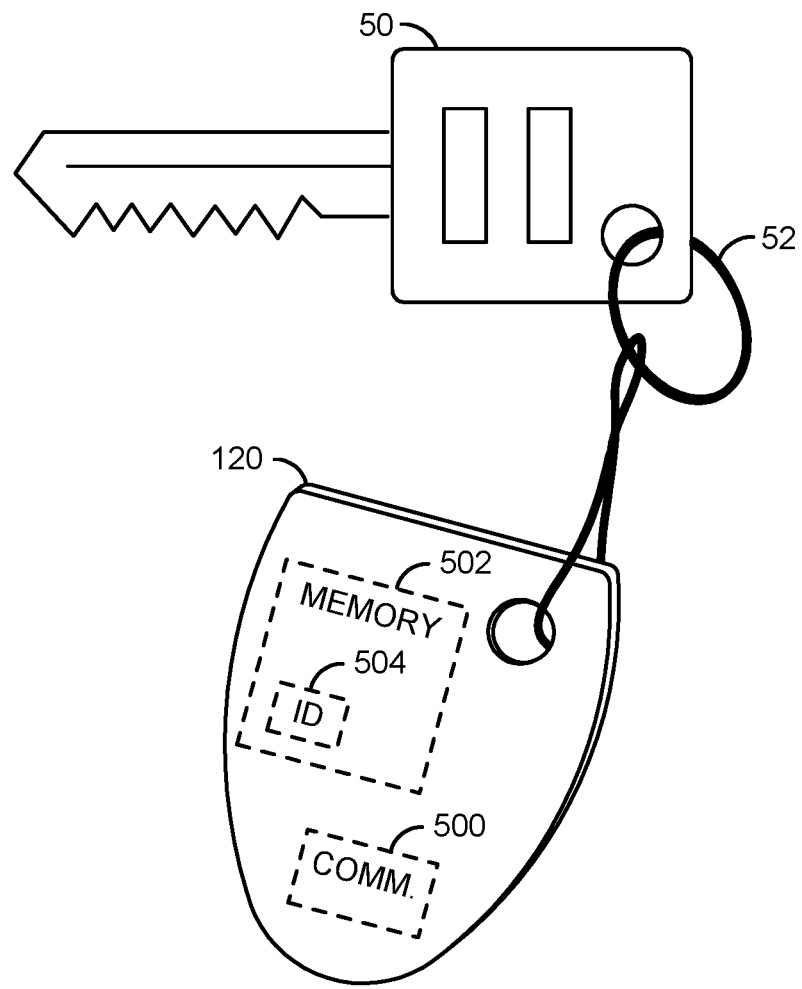
FIG. 7 is a diagram illustrating a tracking device configured to communicate with a smart security light.

Referring to FIG. 7, a diagram illustrating the wireless ID device 120 configured to communicate with the smart security light 102 is shown. The wireless ID device 120 is shown attached to the key 50 and the keychain 52. The wireless ID device 120 may generally be implemented as a small, portable object (e.g., something that may be carried by the user 452 at all times). In an example, the wireless ID device 120 may be attached to a purse, a belt loop, a pocket, clothing, school bags, equipment bags, etc. Generally, the wireless ID device 120 may be connected to an item the user 452 commonly leaves home with. The size, shape, color, and/or accessories used with the wireless ID device 120 may be varied according to the design criteria of a particular implementation.

The wireless ID device 120 may comprise a block (or circuit) 500 and/or a block (or circuit) 502. The circuit 500 may be a communication device. The circuit 502 may be a memory. The wireless ID device 120 may comprise other components (not shown). For example, the wireless ID device 120 may comprise a battery. The wireless ID device 120 may be a self-powered device. In another example, the wireless ID device 120 may optionally comprise a button (e.g., to initiate a pairing with the smart security light 102). The components of the wireless ID device 120 may be varied according to the design criteria of a particular implementation.

The communication device 500 may be configured to communicate with the smart security light 102. In some embodiments, the communication device 500 may be configured to communicate with the internet 108. The communication device 500 may implement a communications protocol configured to implement short-range, low-power, wireless communication. In one example, the communication protocol implemented by the communication device 120 may be a Bluetooth Low Energy (BLE) protocol (e.g., the signal AUTH may be a Bluetooth signal). In another example, the communication protocol implemented by the communication device 500 may be a Wi-Fi protocol. In yet another example, the communication protocol implemented by the communication device 500 may be a ZigBee protocol. The communication protocol implemented by the communication device 500 may be varied according to the design criteria of a particular implementation.

The communication device 500 may be configured to generate the signal AUTH. The communication device 500 may be configured to receive data from the smart security light 102. In an example, the smart security light 102 may be configured to communicate a device ID (e.g., a MAC address, a product identification number, an identification code stored in the database 114, etc.) to identify the smart security light 102 and/or pair the smart security light 102 with the wireless ID device 120.

The memory 502 may store data. The memory 502 may comprise a block (or circuit or module) 504. The block 504 may be an ID block. The ID block 504 may store data corresponding to an identification of the user 452. In an example, the ID block 504 may be implemented to associate the user 452 with the signal AUTH transmitted by the wireless ID device 120. The smart security light 102 may check the data from the ID block 504 to ensure that the user 452 is a known visitor (or the homeowner). The data in the ID block 504 may associate a particular user with the authentication signal AUTH (e.g., the ID block 504 may enable an individualized authentication signal).

The smart security light 102 may be configured to check the data from the ID block 504 with data stored in the database 114 (or the memory 354 of the smart security light 102). The database 114 (or the memory 354) may store identification information about the user 452 (e.g., facial recognition data, relationship to the homeowner, etc.) and/or user preferences (e.g., notification settings, video data uploading settings, etc.). The data in the ID block 504 may be used to associate the identification of the user 452 by the smart security light 102 with the corresponding data in the database 114 (or the memory 354). In an example, data from the ID block 504 may be a code word and/or a hash. The hash may be checked against the database 114 (or the memory 354) and the database 114 (or the memory 354) may store a greater amount of information.

Many different people (or pets) may have the wireless ID device 120 that may be recognized by the smart security light 102. Each user may have different data in the ID block 504 to help the smart security light 102 distinguish between known visitors. In some embodiments, the database 114 (or the memory 354) may associate a different set of components of the smart security light 102 to enable/disable based on the different data stored in the ID block 504. In an example, the data in the ID block 504 may identify a person as the homeowner and the homeowner may have selected settings to prevent uploading the video data to the internet 108 when the homeowner is detected. In another example, the data in the ID block 504 may identify a person as the child of the homeowner and the homeowner may have selected settings to upload the video data of the child. In yet another example, the data in the ID block 504 may identify a person as a domestic worker and the homeowner may have selected settings to upload the video data and send a notification to the homeowner. In some embodiments, the data in the ID block 504 may be used to associate the user with a person on the 'whitelist' stored in the database 114.

In some embodiments, the smart security light 102 and/or the database 114 may group users based on the data in the ID block 504. The smart security light 102 may be configured to enable/disable components the same way for each user in the group. In an example, one group may be 'friends' and when any of the wireless ID devices 120 is detected by the smart security light 102 that corresponds to the users in the 'friends' group, a pre-recorded audio message may be played. In another example, one group may be 'domestic workers', and when any of the wireless ID device 120 is detected by the smart security light 102 that corresponds to the users in the 'domestic workers' group, a notification may be sent to the homeowner. Some users may be associated with more than one group. Generally, the combination of the components of the smart security light 102 that may be enabled/disabled by the signal AUTH may be assigned to each user and/or user group. The number of groups and the responses by the smart security light 102 to the groups may be varied according to the design criteria of a particular implementation.

Each user may receive one or more notifications based on the settings selected and/or based on the data from the ID block 504. For example, the notification may be sent to the user device 110. In one example, the notification may be that a family member has arrived home. In another example, the notification may be that a package has been delivered. In a further example, the notification may be that authorities have been alerted due to a burglar on the premises. The particular notification may be varied to meet the design criteria of a particular implementation. Each user may set up a particular notification type corresponding to the scale of urgency. Set up of notifications may be implemented through the web interface 112 and/or the location settings application 454.

Figure 8:
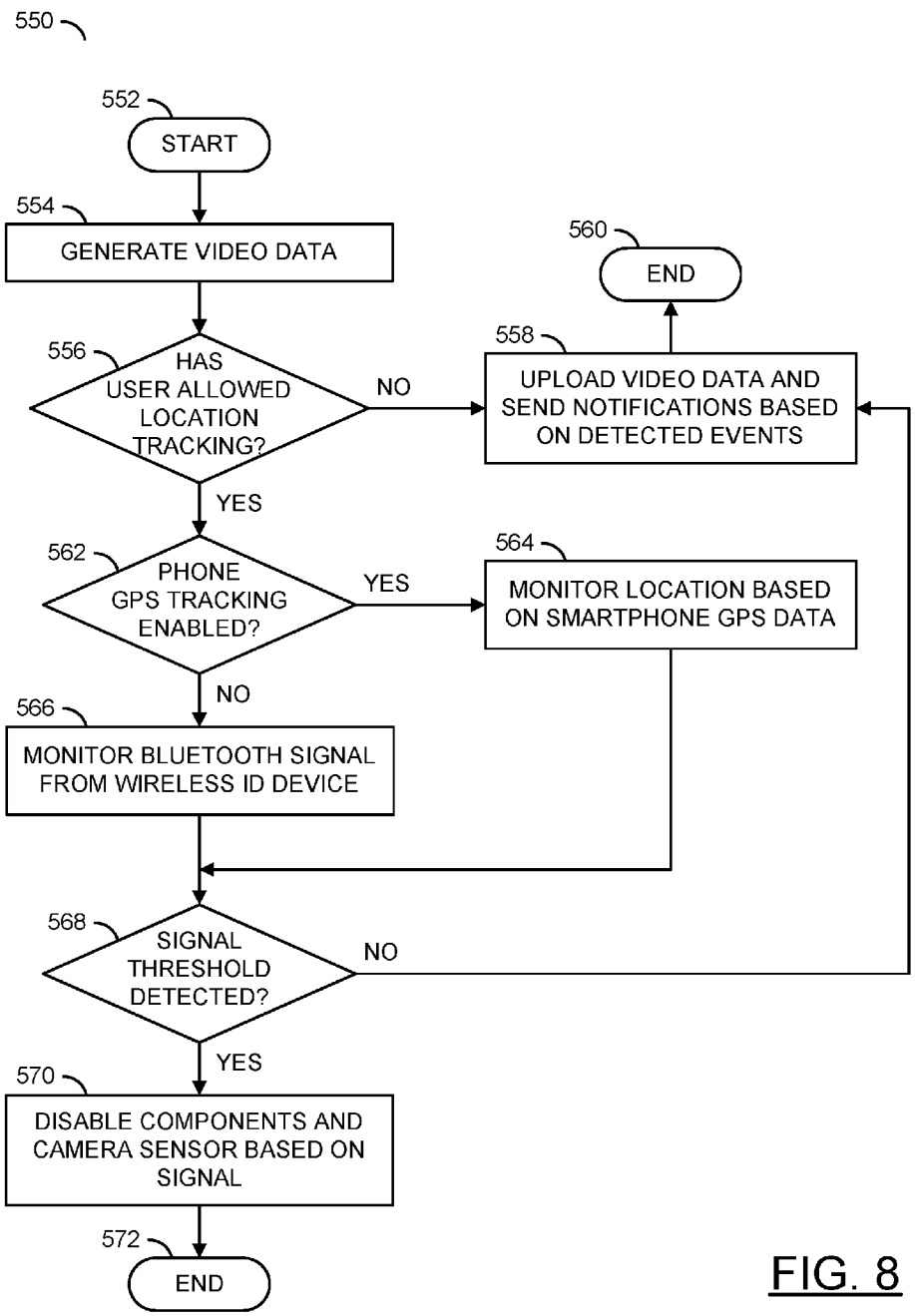
FIG. 8 is a flow diagram illustrating a method for performing a response based on a signal detected from a wireless identification device.

Referring to FIG. 8, a method (or process) 550 is shown. The method 550 may perform a response based on a signal detected from a wireless identification device. The method 550 generally comprises a step (or state) 552, a step (or state) 554, a decision step (or state) 556, a step (or state) 558, a step (or state) 560, a decision step (or state) 562, a step (or state) 564, a step (or state) 566, a decision step (or state) 568, a step (or state) 570, and a step (or state) 572.

The state 552 may start the method 550. In the state 554, the smart security light 102 (e.g., using the camera module 310 and/or the processor 352) may generate video data (e.g., video captured of the environment near the smart security light 102). Next, in the decision state 556, the processor 352 may determine whether the user 452 has allowed location tracking. For example, the location settings interface 454 may be used to disable location tracking for a particular user. If the user 452 has not allowed location tracking, the method 550 may move to the state 558. In the state 558, the smart security light 102 (e.g., using the communication module 104) may upload the video data (e.g., to the database 114) and/or send notifications based on the detected events in the video data (e.g., video analysis may be performed by the processor 352 to determine events such as visitors arriving). Next, the method 550 may move to the state 560. The state 560 may end the method 550. In the decision state 556, if the user 452 has allowed location tracking, the method 550 may move to the decision state 562.

In the decision state 562, the processor 352 may determine whether the smartphone 110 has GPS tracking (e.g., geolocation) enabled. If the GPS tracking is enabled, the method 550 may move to the state 564. In the state 564, the smart security light 102 may monitor the location of the user 452 based on the GPS data of the smartphone 110 (e.g., using the signal AUTH'). Next, the method 550 may move to the decision state 568. In the decision state 562, if the GPS tracking is not enabled, the method 550 may move to the state 566. In the state 566, the smart security light 102 (e.g., using the wireless communication device 104) may monitor the location for the user 452 using a Bluetooth signal from the wireless ID device 120. Next, the method 550 may move to the decision state 568.

In the decision state 568, the smart security light 102 (e.g., using the processor 352 and/or the communication module 104) may determine whether the threshold for the signal AUTH (or AUTH') has been detected. The signal threshold may be a pre-determined value and/or characteristic. In an example, the threshold value for the signal AUTH may be a distance value and/or range of distances. In another example, the threshold value may be a signal strength. In yet another example, the threshold value may be an identification associated with the user (e.g., the data in the ID block 504). If the signal threshold has not been detected, the method 550 may move to the state 558. If the signal threshold has been detected, the method 550 may move to the state 570. In the state 570, the processor 352 may disable one or more components of the smart security light 102 and/or the camera module 310 (e.g., the camera sensor 350) based on the signal AUTH (or AUTH'). Next, the method 500 may move to the state 572. The state 572 may end the method 550.

Figure 9:
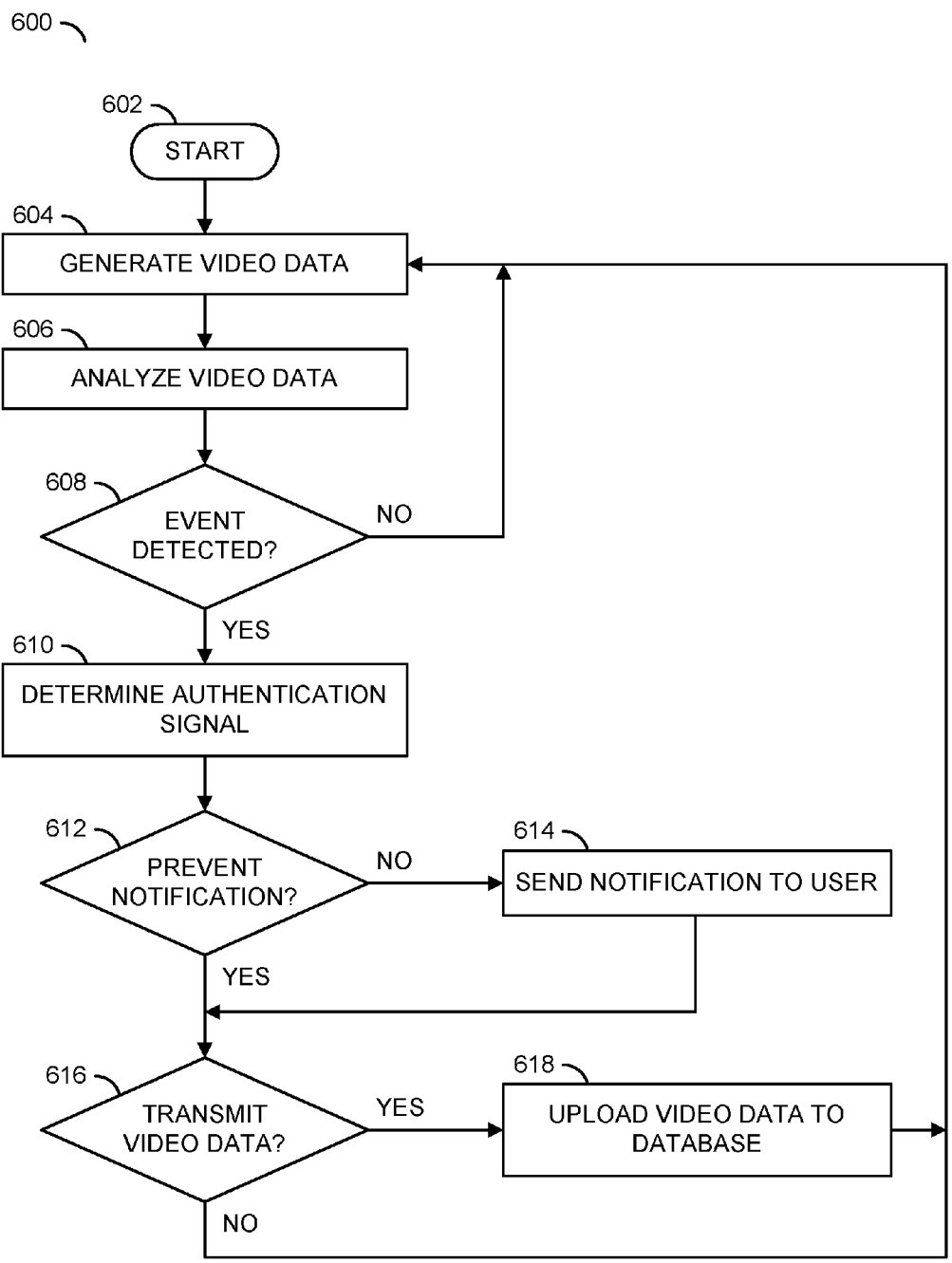
FIG. 9 is a flow diagram illustrating a method for enabling/disabling components of a smart security light in response to an authentication signal.

Referring to FIG. 9, a method (or process) 600 is shown. The method 600 may enable/disable components of a smart security light in response to an authentication signal. The method 600 generally comprises a step (or state) 602, a step (or state) 604, a step (or state) 606, a decision step (or state) 608, a step (or state) 610, a decision step (or state) 612, a step (or state) 614, a decision step (or state) 616, and a step (or state) 618.

The state 602 may start the method 600. In the state 604, the smart security light 102 (e.g., using the camera module 310 and/or the processor 352) may generate video data (e.g., video captured of the environment near the smart security light 102). In the state 606, the smart security light 102 (e.g., using the processor 352 and/or the memory 354) may analyze the video data. For example, the video data may be analyzed to recognize objects and/or determine whether or not events have occurred. Next, the method 600 may move to the decision state 608.

In the decision state 608, the processor 352 may determine whether or not an event has been detected (e.g., a loiterer has been detected, a visitor has arrived, a package has been delivered, a burglar has broken a window, a child has returned home from school, etc.). If the event has not been detected, the method 600 may return to the state 604. If the event has been detected, the method 600 may move to the state 610. In the state 610, the smart security light 102 (e.g., using the processor 352 and/or the wireless communication module 104) may process the authentication signal AUTH (or AUTH'). For example, the processing of the signal AUTH (or AUTH') may be used to determine properties and/or characteristics of the authentication signal (e.g., the distance of the signal, the location of the user 452, additional instructions such as the location settings, etc.). Next, the method 600 may move to the decision state 612.

In the decision state 612, the processor 352 may determine whether or not to prevent notifications (e.g., based on the location settings for the user 452 that may be presented as part of the signal AUTH and/or AUTH' and/or determined by communicating with the database 114). If the notifications are not prevented, the method 600 may move to the state 614. In the state 614, the smart security light 102 (e.g., using the communication module 104) may send the notification to the user 452 (e.g., the smartphone 110). Next, the method 600 may move to the decision state 616. In the decision state 612, if the notification are prevented, the method 600 may move to the decision state 616.

In the decision state 616, the processor 352 may determine whether or not to transmit the video data (e.g., to the smartphone 110 and/or the database 114). If the processor 352 determines to transmit the video data, the method 600 may move to the state 618. In the state 618, the communications module 104 may upload the video data to the database 114. Next, the method 600 may return to the state 604. In the decision state 616, if the processor 352 determines not to transmit the video data, the method 600 may return to the state 604.

Figure 10:
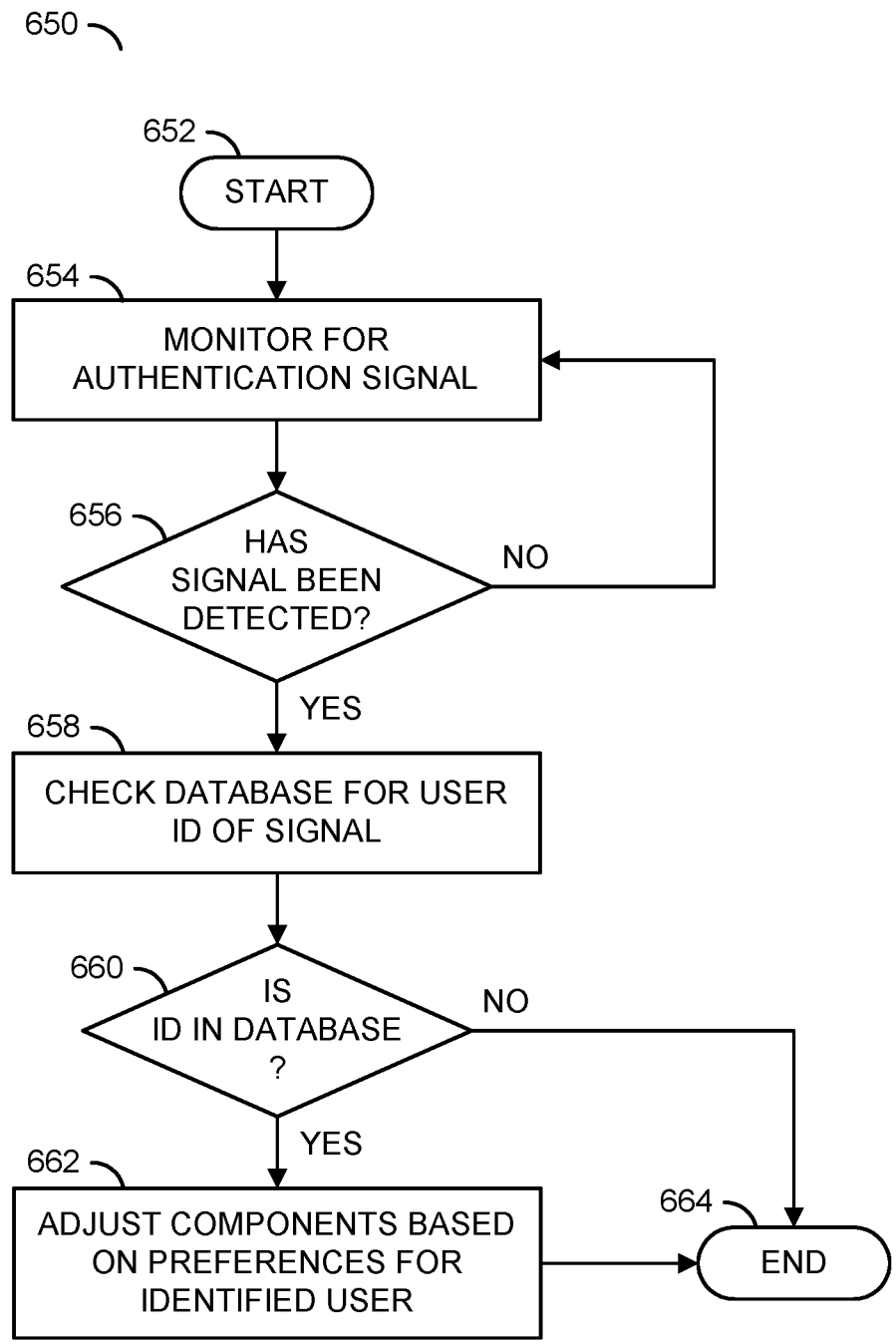
FIG. 10 is a flow diagram illustrating a method for matching a user to database information using a wireless identification device.

Referring to FIG. 10, a method (or process) 650 is shown. The method 650 may match a user to database information using a wireless identification device. The method 650 generally comprises a step (or state) 652, a step (or state) 654, a decision step (or state) 656, a step (or state) 658, a decision step (or state) 660, a step (or state) 662, and a step (or state) 664.

The state 652 may start the method 650. In the state 654, the smart security light 102 (e.g., using the communication module 104) may monitor for the authentication signal AUTH (or AUTH'). Next, the method 650 may move to the decision state 656. In the decision state 656, the communication module 104 may determine whether the authentication signal AUTH (or AUTH') has been detected. If the signal AUTH (or AUTH') has not been detected, the method 650 may return to the state 654. If the signal AUTH (or AUTH') has been detected, the method 650 may move to the state 658.

In the state 658, the system 100 may check the database 114 for the user ID 504 of the signal AUTH (or AUTH'). For example, the smart security light 102 may connect to the database 114 using the communication module 104 and a check may be performed to determine whether the user ID 504 detected in the signal AUTH is listed in the database 114 and retrieve information about the user (e.g., settings, preferences, appropriate responses, etc.). If the user ID 504 is in the database 114, the method 650 may move to the state 662. In the state 662, the smart security light 102 may adjust the components of the smart security light 102 based on the preferences (e.g., stored in the database 114 and/or the memory 354) for the identified user. Next, the method 650 may move to the state 664. In the decision state 660, if the user ID 504 is not in the database 114 the method 650 may move to the state 664. The state 664 may end the method 650.

Figure 11:
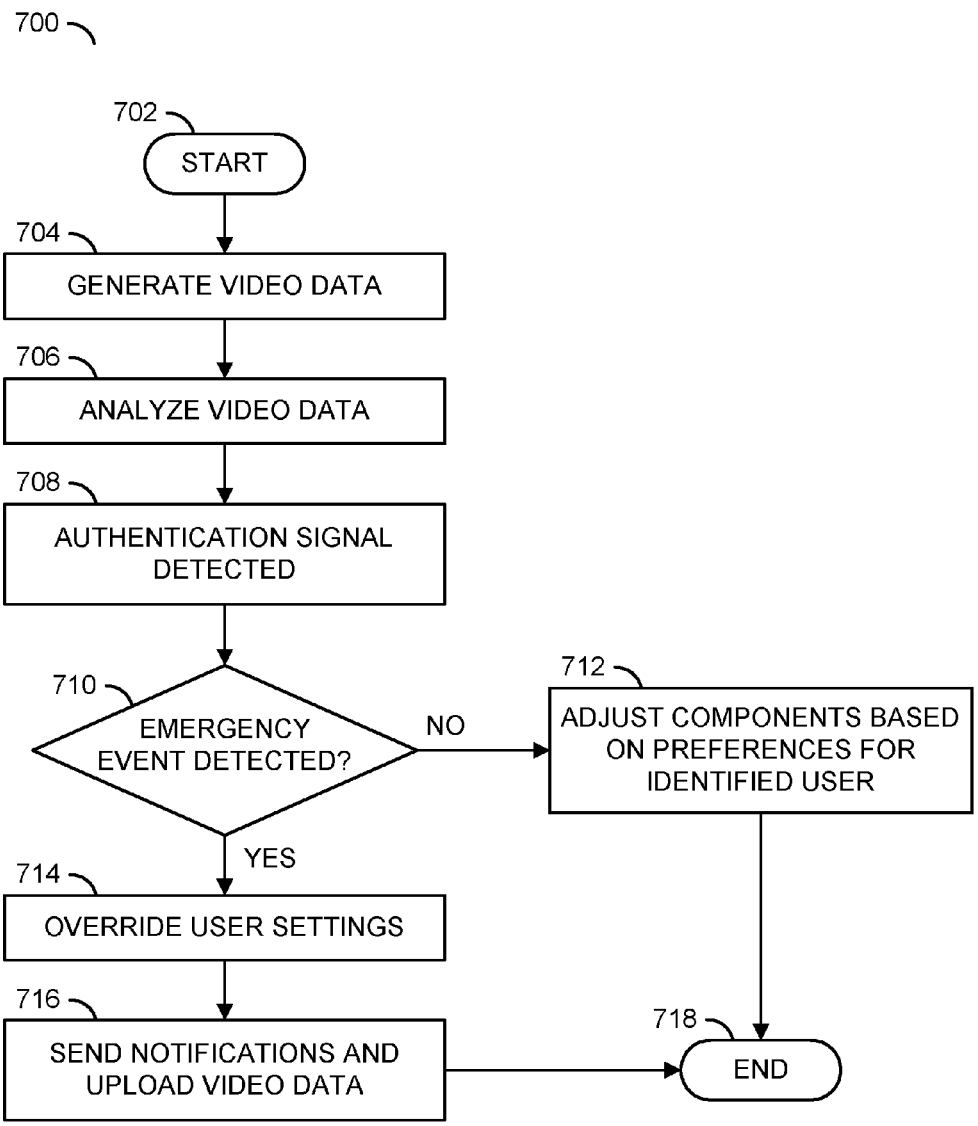
FIG. 11 is a flow diagram illustrating a method for over-riding user settings based on object/event detection using video data.

Referring to FIG. 11, a method (or process) 700 is shown. The method 700 may over-ride user settings based on object/event detection using video data. The method 700 generally comprises a step (or state) 702, a step (or state) 704, a step (or state) 706, a step (or state) 708, a decision step (or state) 710, a step (or state) 712, a step (or state) 714, a step (or state) 716, and a step (or state) 718.

The state 702 may start the method 700. In the state 704, the smart security light 102 (e.g., using the camera module 310 and/or the processor 352) may generate video data (e.g., video captured of the environment near the smart security light 102). In the state 706, the smart security light 102 (e.g., using the processor 352 and/or the memory 354) may analyze the video data. For example, the video data may be analyzed to recognize objects and/or determine whether or not events have occurred. Next, in the state 708, the wireless communication module 104 may detect the authentication signal AUTH (or AUTH'). Next, the method 700 may move to the decision state 710.

In the decision state 710, the smart security light 102 (e.g., the camera module 310 and/or the processor 352) may determine whether an emergency event has been detected. If no emergency event has been detected, the method 700 may move to the state 712. In the state 712, the smart security light 102 may adjust the components of the smart security light 102 based on the preferences for the identified user. Next, the method 700 may move to the state 718. In the decision state 710, if an emergency event has been detected, the method 700 may move to the state 714. In the state 714, the smart security light 102 (e.g., the processor 352) may override the user settings. Next, in the state 716, the wireless communication module 104 may send notifications and/or upload the video data to the database 114. Next, the method 700 may move to the state 718. The state 718 may end the method 700.

The smart cameras 102a-102n may monitor for visitors at the access points 204a-204n. Monitoring by the smart cameras 102a-102n may be automatic. For example, a visitor may not need to press a button (e.g., a button at a door, or a doorbell) to interact with the smart cameras 102a-102n. The smart cameras 102a-102n may automatically detect a visitor and send an alert to the home owner and/or trusted neighbor. In some embodiments, the signal AUTH and/or AUTH' may be configured to disable the automatic monitoring by one or more of the smart cameras 102a-102n. In some embodiments, the signal AUTH and/or AUTH' may be configured to disable one or more features implemented by the components of one or more of the smart security lights 102a-102n (e.g., disabling notifications). By disabling the automatic monitoring and/or features implemented by the components of the smart security lights 102a-102n, privacy issues may be resolved (e.g., homeowners may not want to be recorded), storage issues may be resolved (e.g., video data that homeowners do not want to see may not be uploaded to the cloud service 108 and/or the database 114 reducing storage infrastructure) and/or the number of notifications sent to the user 452 may be reduced (e.g., receiving too many notifications may not be desired by users).

The system 100 may be used to characterize the behavior of visitors. For example, the system 100 may produce a "scale of urgency" (e.g., a scale from 1 to 100). The system 100 may send alert signals to a user based on the scale of urgency. The system 100 may send meta-data and/or a description of a recording from the smart camera 102 along with the alert. For example, the alert signal may be sent to the smart phone 110. The scale of urgency may be determined by the behavior of the visitors (e.g., the time of the visit, how long the visitor remains on the premises, interactions with other premises in the neighborhood, number of doors the visitor attempts to enter, whether the visitor is on a whitelist or a blacklist, based on information from the database 114, based on the signal AUTH, etc.). For example, residents of the home arriving during an expected time frame may have a low scale of urgency rating (e.g., a rating of 1-5). In another example, solicitors arriving at the home during normal business hours may have a scale of urgency higher than a resident of the home.

The wireless ID device 120 may over-ride the scale of urgency. For example, a person detected by the smart security light 102 may be determined to be loitering. However, the loitering person may be a member of the household (e.g., a family member doing yard work). The user 452 may not want to receive a notification when a family member is doing yard work. The user 452 may not want a video recording of the family member doing yard work. The signal AUTH generated by the wireless ID device 120 carried by the family member doing yard work may be implemented to disable (e.g., prevent) the notifications and/or the video recording by the smart security light 102. Furthermore, the wireless ID device 120 may prevent false alarms from being sent to the authorities 208 and/or the receptionist 206 by implementing the signal AUTH.

In another example, if the system 100 detects a delivery the scale of urgency may be higher in order to prevent package thefts. In another example, potential burglars may have the highest rating on the scale of urgency (e.g., 95-100). A high scale of urgency rating when a potential burglar is detected may result in sending an alert to the authorities 208. Information may be sent to the authorities 208 before and after an alarm is triggered to prevent false alarms. The scale of urgency may be customized by each user. The scale of urgency may determine what kind of output signal to produce (e.g., no alert, a simple text alert sent to the smartphone 110, a ring tone alert sent to the smartphone 110, alerting a monitoring service such as the receptionist 206, sounding a panic siren, and/or alerting the authorities 208). In one example, the scale of urgency may be a numerical scale (e.g., 1-100), a color scale (e.g., green to red), static to flashing, silence to a loud alarm, etc.

In one example, a delivery person may visit the front door (e.g., one of the access points 204a-204n). An alert may be sent to the homeowner. The system 100 may enable the homeowner to verify the identity of the delivery person through video and/or a two-way intercom (e.g., implement a virtual receptionist). The system 100 may enable the homeowner to remotely open any door (e.g., a garage door) and/or ask the delivery person to put the package inside the house and/or the garage. The homeowner may remotely close the door, via RF signal from the smart camera system 102.

A network of trusted neighbors (e.g., the homes and/or business premises 202a-202n) may keep an eye on the property of other trusted neighbors 202a-202n. Mobile video devices such as the smartphones 110a-110n, video technology in the smart cameras 102a-102n, 2-way intercoms and/or sharing of "unwelcomed visitors" may be configured to form the eNeighborhood Watch system 200. The group of trusted neighbors 202a-202n may act as if they are the homeowner and present in the home to help deter unwelcomed visitors. The database 114 may store a list of "unwelcomed visitors" among a network of neighbors 202a-202n. The list of unwelcomed visitors may be accessed on the database 114 by using the web interface 112. By using the database 114, the neighborhood 202a-202n may influence unwelcomed visitors to not target their homes. In one example, the system 100 may prevent vandalism. A distance may be set (e.g., 2 ft) and if the hand of a visitor gets too close to the smart camera 102, the smart camera may automatically play a pre-recorded message to deter vandalism of the smart camera 102 and/or any property. The pre-recorded message may be a reminder that the image of the visitor has been uploaded to the cloud service 108. Further deterrence methods may include sirens, flashing lights, smoke, and/or tear gas.

In some embodiments, the wireless ID device 120 may be used by the trusted neighbor/volunteer. The homeowner 452 may provide a temporary access ID to the wireless ID device 120 of the trusted neighbor. In an example, the trusted volunteer may be a neighbor that has been asked to check on a family pet while the family is on vacation. After the vacation, the wireless ID device 120 of the trusted volunteer may be revoked (e.g., the wireless ID device 120 may no longer generate the signal AUTH for the particular smart security light 102). For example, the wireless ID device 120 may be approved (pre-authenticated) for a particular one of the smart security lights 102a-102n without having to loan the wireless ID device 120 to the trusted volunteer (e.g., the trusted volunteer may use their own wireless ID device 120 and/or smartphone 110 for authentication). The data in the ID block 504 of the temporary trusted volunteer may be temporarily associated with the smart security lights 102a-102n.

In one example, a professional central monitoring service may act as the receptionist 206 to communicate with visitors detected at the access points 204a-204n. The central monitoring service facilities may qualify for home insurance discounts. The receptionist 206 may have access to a list of "welcomed visitors" and "unwelcomed visitors" of the various homes 202a-202n on the database 114. The receptionist may be trained on how to respond to different visitors including calling the authorities 208. The receptionist 206 may have access to the eNeighborhood watch database 114. The receptionist functionality may be integrated with the eNeighborhood Watch, allowing users to quickly see if the visitor has already been tagged as suspicious (e.g., on a blacklist) or friendly (e.g., on a whitelist) by another member of the neighborhood 202a-202n.

The system 100 may also implement cloud and/or social connectivity. The smart camera 102 may be connected to a social network consisting of neighbors and/or trusted friends. For example, the neighbors and/or trusted friends may be able to view videos and images taken by the home user. In another example, the neighbors and/or trusted friends may also take action on behalf of the home owner. The smartphones 110a-110n may allow for one-click sharing. For example, content collected by the smart camera system 102a-102n may be easily and directly shared onto the eNeighborhood Watch system 200 by a single click to quickly enable other members of the network to quickly view the content.

The smart camera 102 may automatically collect videos and/or images of individuals. Videos, audio, visitor IDs, visitor profiles and/or images collected by the smart camera 102 may be uploaded to the database 114. Entries for individuals in the database 114 may be updated automatically to reflect the current appearance of the visitor without requiring effort by the users to take extra pictures and manually update visitor profiles. The database 114 may store which of the wireless ID devices 120 are currently approved for the smart security light 102.

The eNeighborhood Watch system 200 may share functionality with other trusted users. The eNeighborhood Watch system 200 may be used to share access, notifications, and/or other system functionality with other trusted users. For example, if a child is visiting the home of a friend that is equipped with the eNeighborhood Watch system 200, the home owner may allow the parents of the child to access the video, and/or images from the smart cameras 102a-102n. Alerts (e.g., delivered via text message, email and/or other means) may be sent from the system 200 so that the parent may be assured that the child safely arrived at the proper destination. The signal AUTH and/or the signal AUTH' may be configured to disable the alerts according to the preferences of the user.

The eNeighborhood Watch system 200 may have multiple levels of trust. Members of the eNeighborhood Watch system 200 may designate another user with different levels of trust. For example, a designated user may be given different default levels of access and/or sharing privileges to the content generated by the smart cameras 102a-102n than the home owner. The home owner may not have to specify each time what access privileges other members will have. The user may be able to share to groups with the same level of trust, and the user may not have to specify individual members to share to. The level of trust may be assigned to the wireless ID device 120. The database 114 may store which of the wireless ID devices 120 are part of which groups (e.g., trust levels).

The system 100 may automatically arm and/or disarm an alarm system and/or send a reminder to smartphone 110 to arm/disarm the alarm. The alarm may be armed/disarmed using facial recognition or voice recognition. The system 100 may keep track of the number of people inside the premise. The tracking may be done by using a smart camera to identify people coming and leaving the premise, detecting a RFID device carried by all people on the premise, a Bluetooth low energy signal on the smartphones 110a-110n, and/or other mobile ID devices (e.g., the wireless ID device 120). Tracking of an RFID device, a Bluetooth low energy signal, and/or other mobile ID devices may be performed by one of the sensor modules 404a-404m of the sensor I/O block 402.

The functions and structures illustrated in the diagrams of FIGS. 8 to 11 may be designed, modeled, emulated, and/or simulated using one or more of a conventional general purpose processor, digital computer, microprocessor, microcontroller, distributed computer resources and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and may be executed by one or more of the processors sequentially or in parallel.

Embodiments of the present invention may also be implemented in one or more of ASICs (application specific integrated circuits), FPGAs (field programmable gate arrays), PLDs (programmable logic devices), CPLDs (complex programmable logic device), sea-of-gates, ASSPs (application specific standard products), and integrated circuits. The circuitry may be implemented based on one or more hardware description languages. Embodiments of the present invention may be utilized in connection with flash memory, nonvolatile memory, random access memory, read-only memory, magnetic disks, floppy disks, optical disks such as DVDs and DVD RAM, magneto-optical disks and/or distributed storage systems.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. A system comprising:
   a camera sensor configured to generate video data of an environment;
   a circuit configured to (A) communicate with a network through a wireless connection, (B) provide an electrical connection to (i) a plurality of components and (ii) said camera sensor and (C) enable at least one of (i) said components and (ii) said camera sensor in response to an authentication signal; and
   an identification device configured to generate said authentication signal, wherein (a) said plurality of components are configured to implement a virtual receptionist, (b) said video data is transmitted to said network, (c) said authentication signal is transmitted using said network and (d) notifications are generated by said components.

2. The system according to claim 1, wherein video data is transmitted to a first network and said authentication signal is transmitted using a second network.

3. The system according to claim 2, wherein said second network comprises a Bluetooth connection.

4. The system according to claim 1, wherein said authentication signal prevents said generation of said notifications.

5. The system according to claim 1, wherein said authentication signal prevents said transmission of said video data.

6. The system according to claim 1, wherein (i) said authentication signal is one of a plurality of authentication signals and (ii) each of said authentication signals is associated with one of a plurality of users.

7. The system according to claim 6, wherein a combination of said components enabled by said authentication signals is assigned for each of said users.

8. The system according to claim 1, wherein (i) said identification device comprises a smartphone and (ii) said system is further configured to implement geolocation for said smartphone.

9. The system according to claim 8, wherein said authentication signal is based on a distance of said smartphone from said circuit.

10. The system according to claim 1, wherein (i) said wireless identification device generates a Bluetooth signal and (ii) said authentication signal is based on said Bluetooth signal.

11. The system according to claim 1, wherein said authentication signal is implemented to prevent false alarms transmitted to emergency services.

12. The system according to claim 1, wherein said camera sensor and said circuit are implemented as a smart security light.

13. The system according to claim 12, wherein said smart security light is configured to (i) perform object detection on said video data and (ii) over-ride said authentication signal based on said object detection.

14. The system according to claim 1, further comprising an application implemented on a computing device configured to enable a user to adjust settings for determining a location of said user based on said identification device.

15. The system according to claim 1, wherein said system is automatically armed and disarmed using facial recognition and voice recognition.

16. The system according to claim 1, further configured to learn the daily schedule of inhabitants by observing the movements of said inhabitants using said authentication signal.

17. The system according to claim 1, further configured to aggregate data from a plurality of said authentication signals to build a unified status of the occupancy and security of a location.

18. The system according to claim 1, wherein said virtual receptionist is configured to execute a response to a detected individual based on a said authentication signal.

19. The system according to claim 18, further configured to (a) develop a profile of said detected individual, (b) store said profile, and (c) update said profile with new data detected by said system.

* * * * *